(12) United States Patent
Malaga

(10) Patent No.: US 9,720,094 B2
(45) Date of Patent: Aug. 1, 2017

(54) SYSTEMS AND METHODS FOR EFFICIENT RECEPTION AND COMBINING OF SIMILAR SIGNALS RECEIVED ON TWO OR MORE ANTENNAS

(71) Applicant: Honeywell International Inc., Morris Plains, NJ (US)

(72) Inventor: Alfonso Malaga, Sammamish, WA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/180,453

(22) Filed: Jun. 13, 2016

(65) Prior Publication Data

US 2016/0370449 A1    Dec. 22, 2016

Related U.S. Application Data

(62) Division of application No. 13/569,797, filed on Aug. 8, 2012, now Pat. No. 9,366,761.

(51) Int. Cl.
*G01S 19/15* (2010.01)
*G01S 13/91* (2006.01)
(Continued)

(52) U.S. Cl.
CPC ............... *G01S 19/15* (2013.01); *G01S 1/50* (2013.01); *G01S 3/043* (2013.01); *G01S 13/91* (2013.01);
(Continued)

(58) Field of Classification Search
CPC .......... G01S 19/15; G01S 13/91; G01S 3/043; G01S 1/50; H04B 7/0871; H04B 1/0064; H04B 7/0817
See application file for complete search history.

(56) References Cited

U.S. PATENT DOCUMENTS 3,936,829 A    2/1976  Overbury
3,946,320 A    3/1976  Overbury et al.
(Continued)

FOREIGN PATENT DOCUMENTS

EP    1630975    3/2006

OTHER PUBLICATIONS

European Patent Office, "Office Action", "from Foreign Counterpart of U.S. Appl. No. 13/569,797", Dec. 11, 2013, pp. 1-7, Published in: EP.

(Continued)

*Primary Examiner* — Matthew M Barker
(74) *Attorney, Agent, or Firm* — Fogg & Powers LLC

(57) ABSTRACT

A radio signal processing system includes a first antenna; a second antenna; a first receiver communicatively coupled to the first antenna; a second receiver communicatively coupled to the second antenna; a first processing unit communicatively coupled to the first receiver and configured to receive a first signal from at least one of the first antenna and the second antenna when the system is operating in a first mode; a second processing unit communicatively coupled to the second receiver and configured to receive a second signal from the second antenna when the system is operating in a first mode; and wherein the first processing unit is further configured to receive a third signal from both the first antenna and the second antenna when the system is operating in a second mode.

9 Claims, 14 Drawing Sheets

(51) Int. Cl.
G01S 1/50 (2006.01)
G01S 3/04 (2006.01)
H04B 7/08 (2006.01)
H04B 1/00 (2006.01)

(52) U.S. Cl.
CPC ......... *H04B 7/0817* (2013.01); *H04B 7/0825* (2013.01); *H04B 7/0871* (2013.01); *H04B 1/0064* (2013.01)

(56) References Cited

U.S. PATENT DOCUMENTS

| | | | |
|---|---|---|---|
| 4,106,023 | A | 8/1978 | Baghdady |
| 4,359,733 | A | 11/1982 | O'Neill |
| 4,658,359 | A | 4/1987 | Palatucci et al. |
| 5,859,878 | A | 1/1999 | Phillips et al. |
| 5,867,535 | A | 2/1999 | Phillips |
| 6,072,994 | A | 6/2000 | Phillips et al. |
| 6,477,359 | B2 | 11/2002 | Heppe et al. |
| 6,570,531 | B1 | 5/2003 | Stratton et al. |
| 6,720,920 | B2 | 4/2004 | Breed et al. |
| 7,068,233 | B2 | 6/2006 | Thornberg et al. |
| RE40,479 | E | 9/2008 | Wright et al. |
| 7,428,450 | B1 | 9/2008 | Oberg |
| 7,430,415 | B2 | 9/2008 | Campbell |
| 7,437,225 | B1 | 10/2008 | Rathinam |
| 7,489,274 | B2 | 2/2009 | Doyle |
| 7,720,506 | B1 | 5/2010 | Gribble |
| 8,019,336 | B2 | 9/2011 | Jones et al. |
| 8,019,338 | B2 | 9/2011 | Malaga et al. |
| 9,069,070 | B2 | 6/2015 | Savoy et al. |
| 2001/0033607 | A1 | 10/2001 | Fleming et al. |
| 2001/0053174 | A1 | 12/2001 | Fleming et al. |
| 2002/0003790 | A1 | 1/2002 | Heppe et al. |
| 2007/0105505 | A1 | 5/2007 | Crocker et al. |
| 2008/0122694 | A1 | 5/2008 | Doyle |
| 2008/0139156 | A1 | 6/2008 | Behzad et al. |
| 2009/0298451 | A1 | 12/2009 | Malaga et al. |
| 2012/0115553 | A1 | 5/2012 | Mahe et al. |

OTHER PUBLICATIONS

European Patent Office, "European Search Report", "from Foreign Counterpart of U.S. Appl. No. 13/569,797", Nov. 29, 2013, pp. 1-4, Published in: EP.

U.S. Patent and Trademark Office, "Corrected Notice of Allowability", "from U.S. Appl. No. 13/569,797", Feb. 22, 2016, pp. 1-2, Published in: US.

U.S. Patent and Trademark Office, "Notice of Allowance", "from U.S. Appl. No. 13/569,797", Feb. 11, 2016, pp. 1-7, Published in: US.

U.S. Patent and Trademark Office, "Office Action", "from U.S. Appl. No. 13/569,797", Sep. 17, 2015, pp. 1-16, Published in: US.

U.S. Patent and Trademark Office, "Restriction Requirement", "from U.S. Appl. No. 13/569,797", Apr. 28, 2015, pp. 1-6, Published in: US.

"Instruments—part 2", , pp. 1-57, Publisher: Available at least as early as Apr. 9, 2012, downloaded from: http://flightplanweb.com/amop/INS/amop_instruments_part2.ppt on Apr. 9, 2012.

Ely et al., "Wireless Phone Threat Assessment and New Wireless Technology Concerns for Aircraft Navigation Radios", Jul. 2003, pp. 1-198.

"GNSS Sole Service Feasibility Study", May 2003, pp. 1-204.

"National Airspace System Capital Investment Plan FY 2008-2012", Mar. 1, 2007, pp. 1-218.

Hand, "GPS in Aviation and the Coming Age of Automated Landing Systems", Apr. 17, 2006, pp. 1-32.

"Instrument Landing System", downloaded from: "http://selair.selkirk.bc.ca/Training/systems/power-point/AVIA%20261/09INSTRUMENT%20LANDING%20SYSTEM.ppt", , pp. 1-15, Publisher: Instrument Landing System, Computer Services, Selkirk College, Apr. 9, 2012.

"Instrument Landing System", , pp. 1-45, Publisher: downloaded from: http://www.icpschool.ca/Downloads/Briefings/ALA/ALA4/INSTRUMENT%20LANDING%20SYSTEM%20ALA%204%202009.ppt on Apr. 9, 2012.

"Honeywell Maintenance Manual: Integrated Navigation Receiver", Oct. 30, 2009, pp. 1-134.

"Ofcom Contract AY4620 'Final Report'", Jun. 15, 2004, pp. 1-346.

"Precision Approach and Landing System", "on Apr. 9, 2012", , pp. 1-50, Publisher: available at least as early as Apr. 9, 2012, downloaded from: http://www.doe.carleton.ca/courses/ELEC4504/PrecisionApproachandLandingSystems.ppt.

Pullen et al., "1.5 System Overview, Recent Developments, and Future Outlook for WAAS and LAAS", , pp. 1-12, Publisher: Department of Aeronautics and Astronautics, Standford University, downloaded from: waas.stanford.edu/~wwu/papers/gps/PDF/PullenTokyo02.pdf on Apr. 9, 2012.

Schoephoerster, "Instrument Ground Training Module 3: Instrument Flying", "www.1instrumentground.com/.../Instrument_ground_module_3.ppt Apr. 9, 2012", , pp. 1-31, Publisher: Schroephoerster, Instrument Ground Training Module 3 in Instrument Flying Handbook, published as least as early as Monday, Apr. 9, 2012, downloaded.

"Uh-60 Navigation and Command Instrument System", , Publisher: downloaded from: http://www.usarmyaviation.com/studyguides/index.php?folder=Documents/UH-60BlackhawkSpecific/CIS&download=CIS.ppt on Apr. 9, 2012.

Chinese Patent Office, "Office Action, from CN Application No. 201310341262X, mailed Sep. 14, 2016", "from Foreign Counterpart of U.S. Appl. No. 13/569,797", Sep. 14, 2016, pp. 1-15, Published in: CN.

European Patent Office, "Communication pursuant to Article 94(3) EPC, from EP Application No. 13177923.3, mailed Sep. 20, 2016", "from Foreign Counterpart of U.S. Appl. No. 13/569,797", Sep. 20, 2016, pp. 1-4, Published in: EP.

State Intellectual Property Office, P.R. China, "Office Action", "from Foreign Counterpart of U.S. Appl. No. 13/569,797", dated Apr. 19, 2017, pp. 1-7.

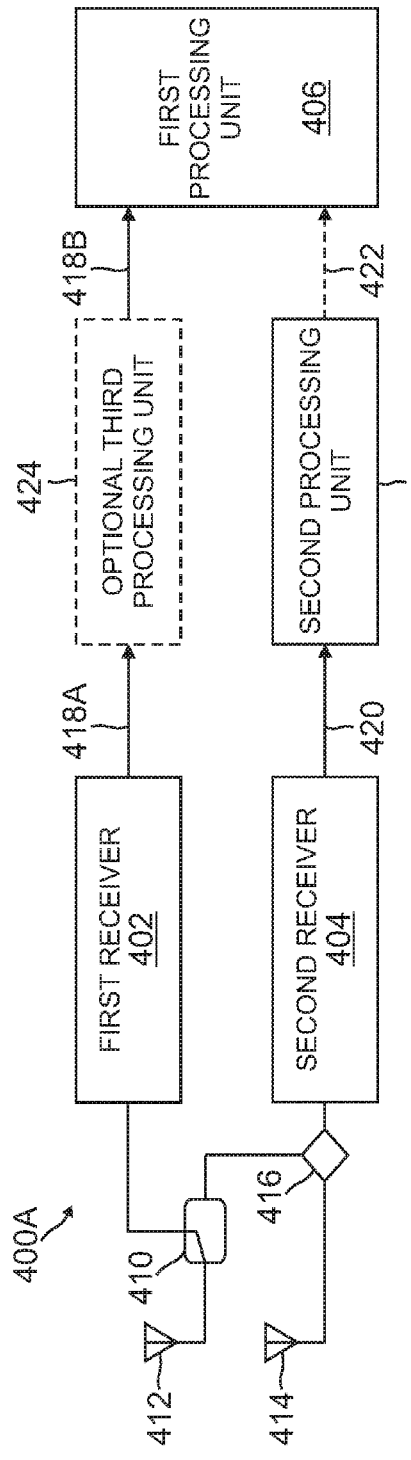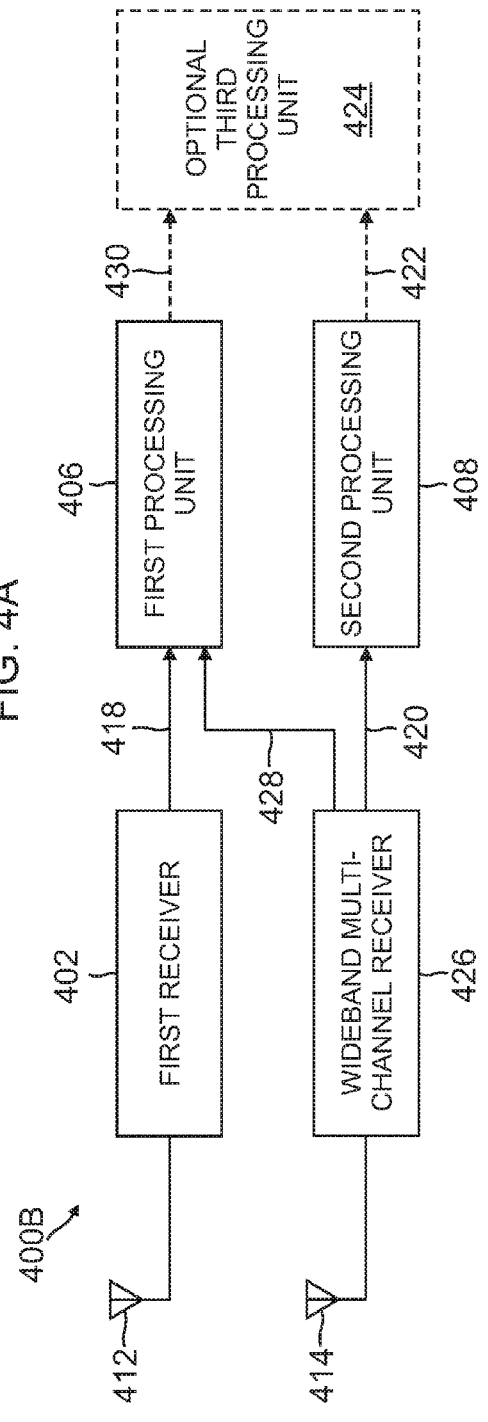
FIG. 4A
FIG. 4B

SYSTEMS AND METHODS FOR EFFICIENT RECEPTION AND COMBINING OF SIMILAR SIGNALS RECEIVED ON TWO OR MORE ANTENNAS

CROSS-REFERENCE TO RELATED APPLICATION

This application is a divisional of pending U.S. application Ser. No. 13/569,797, entitled SYSTEMS AND METHODS FOR EFFICIENT RECEPTION AND COMBINING OF SIMILAR SIGNALS RECEIVED ON TWO OR MORE ANTENNAS filed on Aug. 8, 2012, the disclosure of which is incorporated herein by reference.

BACKGROUND

Some aircraft are equipped with VHF Omni Ranging (VOR) radio receivers for enroute navigation and with Instrument Landing System (ILS) and Global Navigation Satellite System (GNSS) Landing System (GLS) receivers for precision approach navigation used during aircraft landing. ILS receivers include a Localizer VHF radio receiver to receive horizontal guidance signals for the selected airport runway. GLS receivers include a VHF data broadcast (VDB) receiver to receive the GLS glide path way points and the local Differential GNSS (DGNSS) corrections applicable to the runway selected for landing.

Because simultaneous reception of VOR and ILS Localizer or GLS VDB signals is required during initial approach and during aborted auto-land operations, many aircraft are equipped with two VHF receivers for VOR and two VHF receivers for either ILS Localizer or GLS VDB reception. Thus, many aircraft have four or more VHF receivers. A means to reduce the number of VHF receivers that must be fed by the VOR antenna is desired.

SUMMARY

A radio signal processing system includes a first antenna; a second antenna; a first receiver communicatively coupled to the first antenna; a second receiver communicatively coupled to the second antenna; a first processing unit communicatively coupled to the first receiver and configured to receive a first signal from at least one of the first antenna and the second antenna when the system is operating in a first mode; a second processing unit communicatively coupled to the second receiver and configured to receive a second signal from the second antenna when the system is operating in a first mode; and wherein the first processing unit is further configured to receive a third signal from both the first antenna and the second antenna when the system is operating in a second mode.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 1 is a general block diagram depicting an exemplary embodiment of an aircraft implementing a radio navigation system and a landing guidance system for receiving VOR and ILS Localizer or VDB signals using a tail-mounted antenna and for simultaneously receiving ILS Localizer or VDB signals using a nose-mounted antenna and either combining or selecting one of two or more similar signals received on two or more antennas;

FIG. 2A is a block diagram depicting an exemplary embodiment of a radio navigation system using two single-channel VHF receivers connected to a tail-mounted VOR antenna and a nose-mounted ILS localizer antenna to receive the VDB landing guidance signal and either combining two similar VDB signals or selecting one of the similar signals received using the two antennas;

FIG. 2B is a block diagram depicting an exemplary embodiment of a radio navigation system using a wideband VHF multi-channel receiver connected to a tail mounted-antenna to receive VOR and VDB or ILS localizer signals and a single-channel VHF receiver connected to a nose-mounted antenna to receive VDB or ILS localizer signals and either combining the similar VDB signals or selecting one of the similar VDB or ILS localizer signals received on the two antennas;

FIGS. 4A-4E are block diagrams depicting exemplary embodiments of simplified radio navigation and landing guidance radio signal processing systems for receiving signals using two or more antennas connected to single-channel or wideband multi-channel receivers and either combining or selecting one of two or more similar signals received on two or more antennas;

Figure 1:
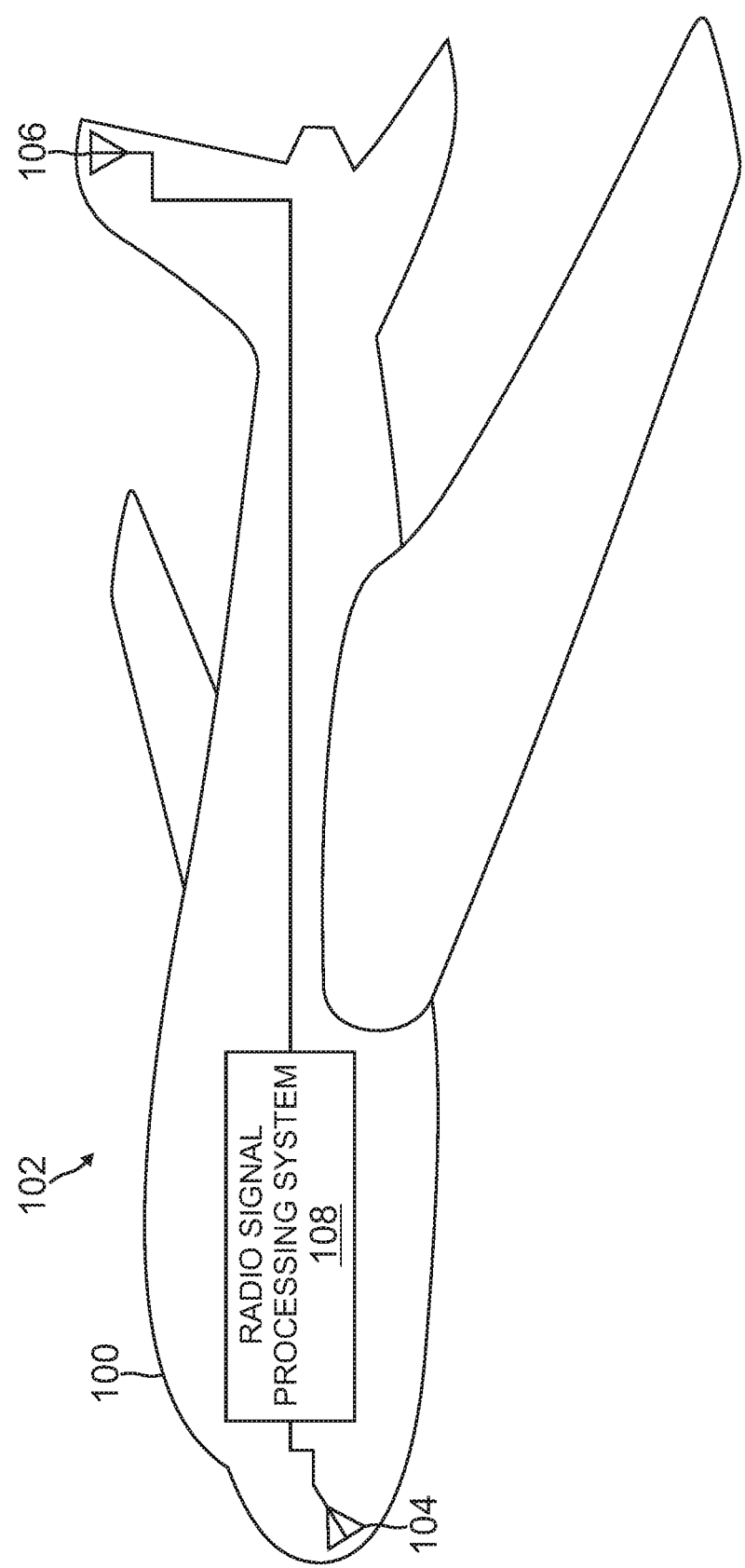

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification is not to be construed as limiting the order in which the individual steps may be performed. The following detailed description is, therefore, not to be taken in a limiting sense.

FIG. 1 is a general block diagram depicting an exemplary embodiment of an aircraft 100 implementing a system 102 for receiving signals and combining similar signals received on two or more antennas. The system 102 includes a nose mounted antenna 104, a tail mounted antenna 106, and a radio signal processing system 108. Nose mounted antenna 104 is mounted on or in the nose of aircraft 100. In exemplary embodiments, nose mounted antenna 104 is an ILS localizer antenna. In contrast, tail mounted antenna 106 is mounted on or in the tail of the aircraft 100. In exemplary embodiments, tail mounted antenna 106 is a VOR antenna. Radio signal processing system 108 is communicatively coupled to both nose mounted antenna 104 and tail mounted antenna 106 and receives various radio frequency (RF) signals through nose mounted antenna 104 and tail mounted antenna 106.

VOR radio navigation receivers for many aircraft require omni-directional antennas mounted on the vertical tail of the aircraft, such as tail mounted antenna 106. ILS Localizer and VHF data broadcast (VDB) receivers can also use the VOR antenna (such as tail mounted antenna 106) during initial approach and subsequently switch to an ILS Localizer antenna mounted under the nose of the aircraft (such as nose mounted antenna 104). When a single VOR antenna feeds a plurality of VHF receivers (such as the four VHF receivers often used in prior art systems for redundant simultaneous reception of VOR and VDB or redundant simultaneous reception of VOR and ILS localizer), there can be significant installation loss/reduction in range coverage. In some examples, this installation loss/reduction in range coverage is a factor of two.

Furthermore, the VDB ground station may not necessarily be in front of the aircraft during final approach so that using the nose mounted ILS Localizer antenna (such as nose mounted antenna 104), which provides no coverage in directions towards the rear of the aircraft, for VDB signal reception may result in long outages where no Differential GNSS (DGNSS), such as Differential GPS (DGPS), corrections are received during the most critical phase of landing. Therefore, some aircraft installations may use the VOR antenna (such as tail mounted antenna 106) for VDB reception during all phases of landing. However, the tail mounted VOR antenna (such as tail mounted antenna 106) coverage on very large aircraft is blocked by the fuselage in the downward looking directions towards the front of the aircraft (such as aircraft 100). Therefore reception of VDB signals using the VOR antenna (such as tail mounted antenna 106) during all phases of landing does not guarantee absence of reception blind spots. Thus, a means to use both the VOR antenna (such as tail mounted antenna 106) and ILS Localizer antenna (such as nose mounted antenna 104) to receive VDB signals while simultaneously receiving VOR signals without adding more VHF receivers is highly desirable and facilitated by the systems and methods described herein.

Instrument Landing System (ILS) uses VHF and UHF radio signals to guide the aircraft 100 down onto runways automatically by sending ILS localizer (VHF) and glide slope (UHF) beacon signals from ground transmitters. Aircraft 100 hones onto the ILS localizer and glide slope beacon signals, which are used to control the autopilot to land aircraft 100 onto the runway. In exemplary embodiments, nose mounted antenna 104 is a VHF localizer antenna. Once aircraft 100 has a clear forward-looking line of sight of the station on the ground transmitting the ILS localizer and glide slope beacon signals, the ILS localizer and glide slope beacon signals can be honed through the nose mounted antenna 104, and a UHF antenna that may be mounted also in the nose or in the landing gear to effectively land the aircraft 100. Before aircraft 100 lines up with the runway, when it is approaching the airport, it needs to capture the ILS localizer beacon signal and it may use the tail mounted antenna 106 that is mounted on the top of or inside of the vertical tail fin of aircraft 100. In exemplary embodiments, tail mounted antenna 106 is a VHF VOR/VDB antenna. Nose mounted antenna 104 has good coverage in front of aircraft 100, but it does not have good omni-directional coverage to the sides and behind aircraft 100. Thus, when aircraft 100 is approaching the airport, tail mounted antenna 106 is used to capture the ILS localizer beacon signal. In exemplary embodiments, nose mounted antenna 104 and tail mounted antenna 106 are both capable of receiving VOR, ILS localizer, and VDB signals in the 108-118 MHz band.

Global Navigation Satellite System (GNSS) Landing System (GLS) offers alternative landing guidance to ILS with more flexibility. In example embodiments, the GNSS system is implemented using a Global Positioning System (GPS) Landing System (GLS), but it is understood that the system is not limited to GPS signals. In other implementations, other types of Global Navigation Satellite Systems (GNSS), such as GLONASS, Galileo, Beidou and Compass navigation systems, and combinations thereof, may in time be used instead of GPS to obtain the aircraft position relative to the desired landing path to generate the guidance signals provided to the autopilot. One benefit of GLS is that the VDB ground stations can be located anywhere in the airport, unlike ILS ground stations which must be located at the end of the runway. In contrast to ILS, GLS doesn't send a homing signal. Instead, GLS employs a VHF Data Broadcast (VDB) data link to send messages up to the aircraft 100 that provide waypoints that the aircraft 100 follows to properly approach and land the aircraft 100 on the runway. The GLS transmitter also employs the VDB data link to send corrections to the ranging signals received from the constellation of GNSS satellites. Corrections are sent to the aircraft 100 to make the GNSS position estimates very accurate. Aircraft 100 uses the GNSS ranging signals and the corrections to calculate its position and also to calculate how far it is from the waypoints and to steer the aircraft 100 to line up with the waypoints.

Because the VDB ground stations can be located anywhere within 3 nautical miles (nmi) of the airport runways, the tail mounted antenna 106 is used in exemplary embodiments to allow for omnidirectional coverage. In some of these exemplary embodiments, the fuselage, wings, engines, and other components of the aircraft 100 can block the line of site between the tail mounted antenna 106 and certain locations. In these embodiments, the pattern of the tail mounted antenna may have gaps in coverage. In some exemplary embodiments, as the aircraft 100 approaches and turns to start landing, if the ground station is in front of the airplane where coverage gaps in the antenna pattern may exist, the aircraft 100 may start losing the VDB signals that are being sent from the VDB ground station. If the aircraft 100 starts losing the VDB signals, it can lose the waypoints and GNSS corrections. While the waypoints don't typically change, correct reception of the GNSS corrections is important to ensure that the position of the aircraft 100 is accurate. In other exemplary embodiments, the nose mounted antenna 104 is used to receive the VDB signal to allow for clear unobstructed coverage in front of the aircraft. In these embodiments, the fuselage blocks reception of signals arriving from the rear of the aircraft so when the aircraft gets close to the runway and the VDB station is now behind or towards the side of the aircraft, the aircraft may start losing the VDB signals and therefore lose the GNSS corrections.

In order to maximize the probability of correct reception of the VDB (or ILS localizer) landing guidance signals during all phases of GLS (or ILS) landing modes, the landing guidance signals are received using both the nose mounted antenna 104 and the tail mounted antenna 106. The coverage area of the nose mounted antenna 104 complements the coverage area of the tail mounted antenna 106 and vice versa.

Figure 2A:
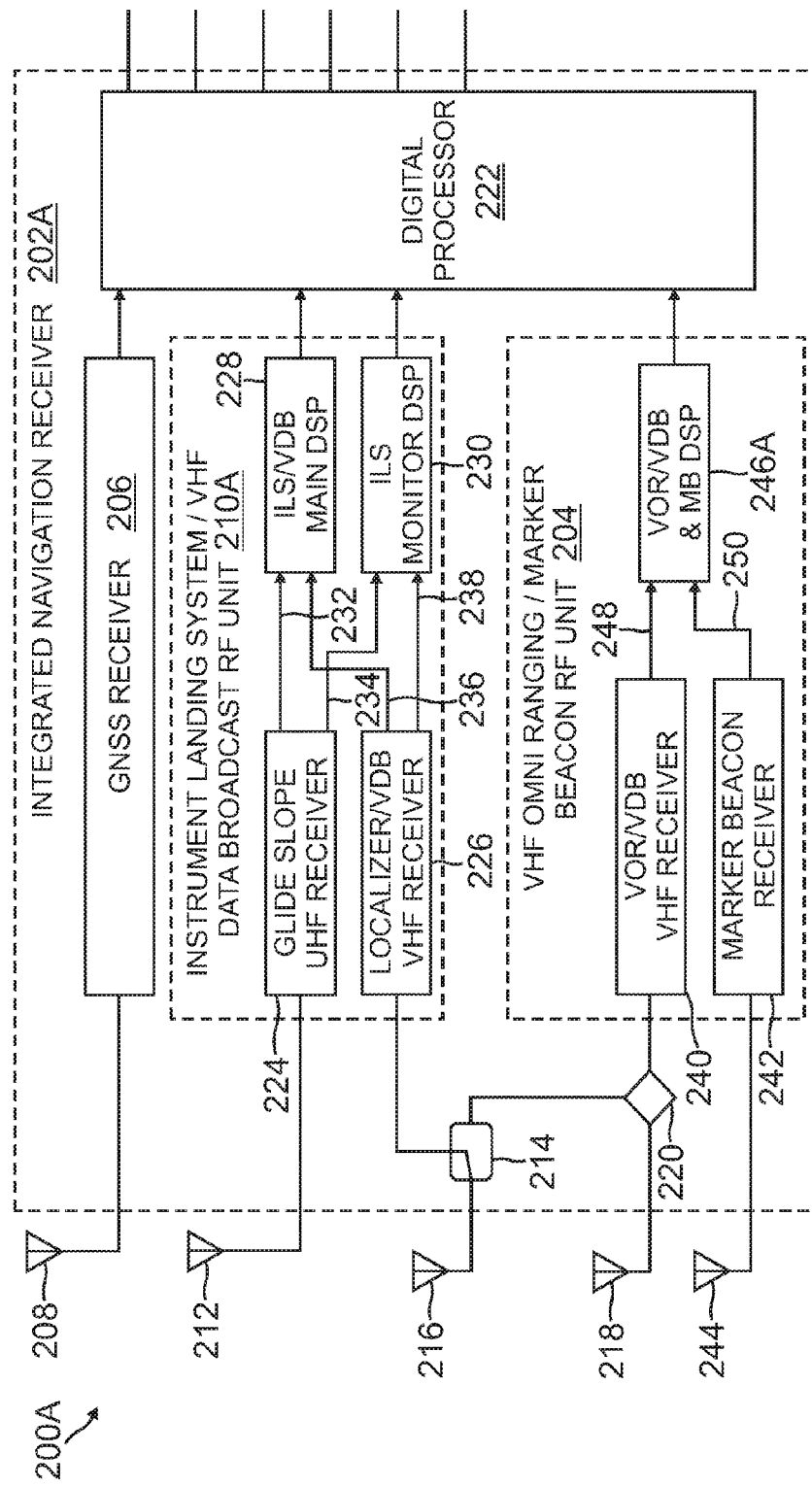
FIG. 2C is a block diagram depicting an exemplary embodiment of a radio navigation system using a single wideband VHF receiver to receive VOR and VDB or ILS localizer signals and the receiver is switched to receive the VOR and VDB or ILS signals using either the tail mounted or nose mounted antenna as required to maintain best reception.
Figure 3A:
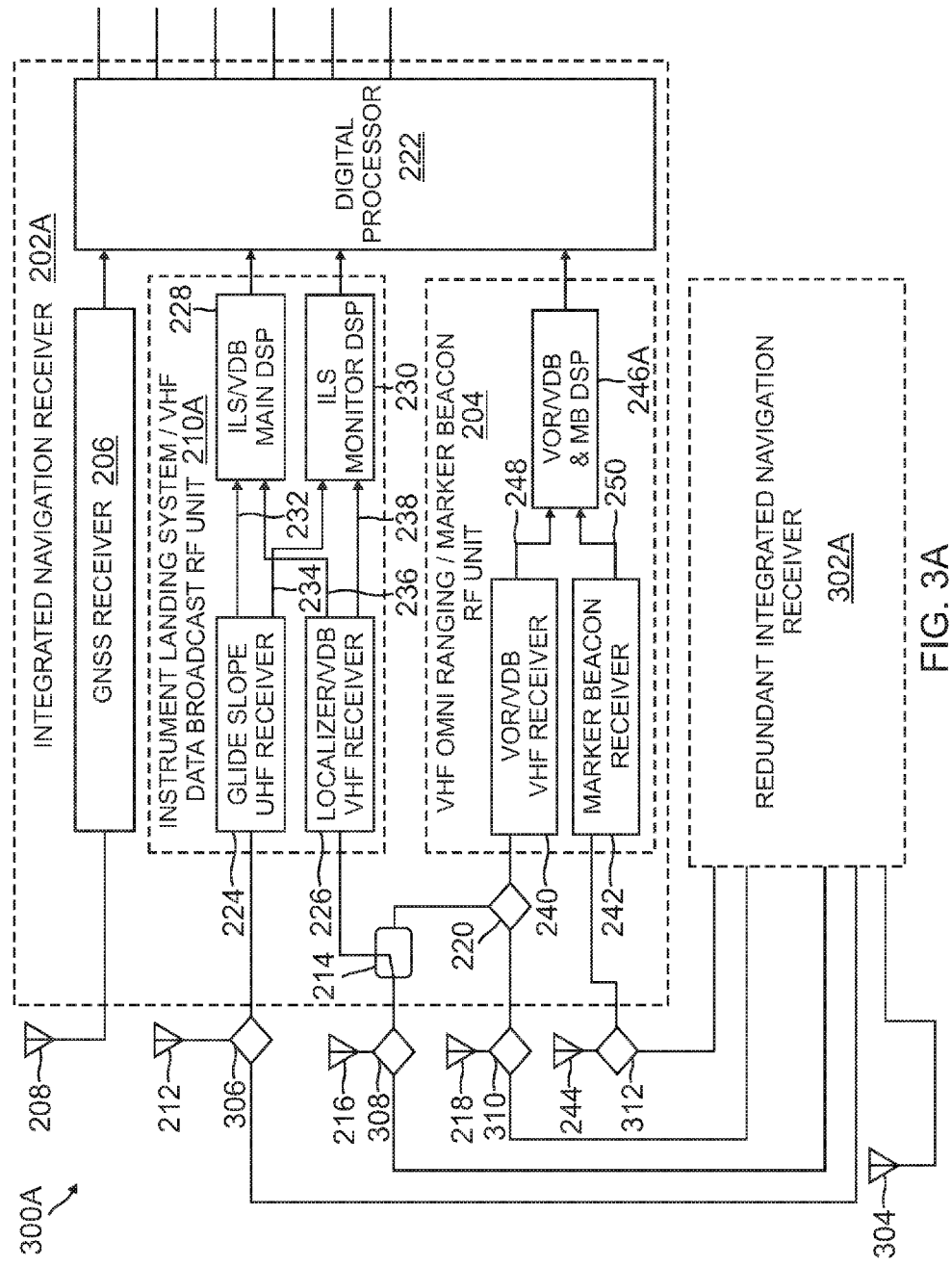
FIG. 3A is a block diagram depicting an exemplary embodiment of a redundant radio navigation system including a plurality of the redundant radio navigation systems of FIG. 2A.

Thus, a first part of the systems and methods described herein is use of both an ILS localizer VHF receiver connected to a nose mounted ILS localizer antenna (such as nose mounted antenna 104) and a VOR VHF receiver connected to a tail fin VOR antenna (such as tail mounted antenna 106) to receive GLS VDB signals during approach and landing when the approach and landing mode is GLS. In exemplary embodiments, the ILS localizer VHF receiver and the VOR VHF receiver are included in aircraft avionics systems (such as the radio signal processing system 108). In exemplary embodiments, digital processing of signals received from both the ILS localizer antenna (such as nose mounted antenna 104) and tail fin VOR antenna (such as tail mounted antenna 106) can be used to select the strongest of the two signals (diversity selection) or to combine both signals in-phase (diversity combining). This helps to reduce and/or eliminate outages due to the coverage holes of the ILS Localizer and the VOR antennas. However, VOR reception during approach and landing may no longer be possible without additional modification, which may not always be acceptable. FIGS. 2A, 3A, and 4A and accompanying description below are directed toward detailed exemplary embodiments implementing this first part.

Thus, a second part of the systems and methods described herein is use of a wideband multi-channel VHF receiver capable of receiving all channels in the 108-118 VHF Navigation receive band and then using digital signal processing to select two or more VHF channels for signal detection, demodulation, navigation/landing guidance data decoding and output. In exemplary embodiments where a wideband multi-channel VHF receiver is connected to the tail fin VOR antenna (such as tail mounted antenna 106), it is possible to simultaneously receive VOR and GLS VDB navigation signals on the VOR antenna when the landing mode is GLS or VOR and ILS Localizer navigation signals when the landing mode is ILS. In exemplary embodiments, a conventional single-channel VHF receiver connected to the ILS Localizer antenna (such as the nose mounted antenna 104) would be used to receive VDB signals when the landing mode is GLS. This allows simultaneous reception of the VOR signal with dual reception of the VDB signal on both the tail fin VOR antenna (such as tail mounted antenna 106) and ILS Localizer antenna (such as nose mounted antenna 104). This maintains the capability to receive VOR signals while eliminating the VDB reception coverage holes.

Figure 2B:
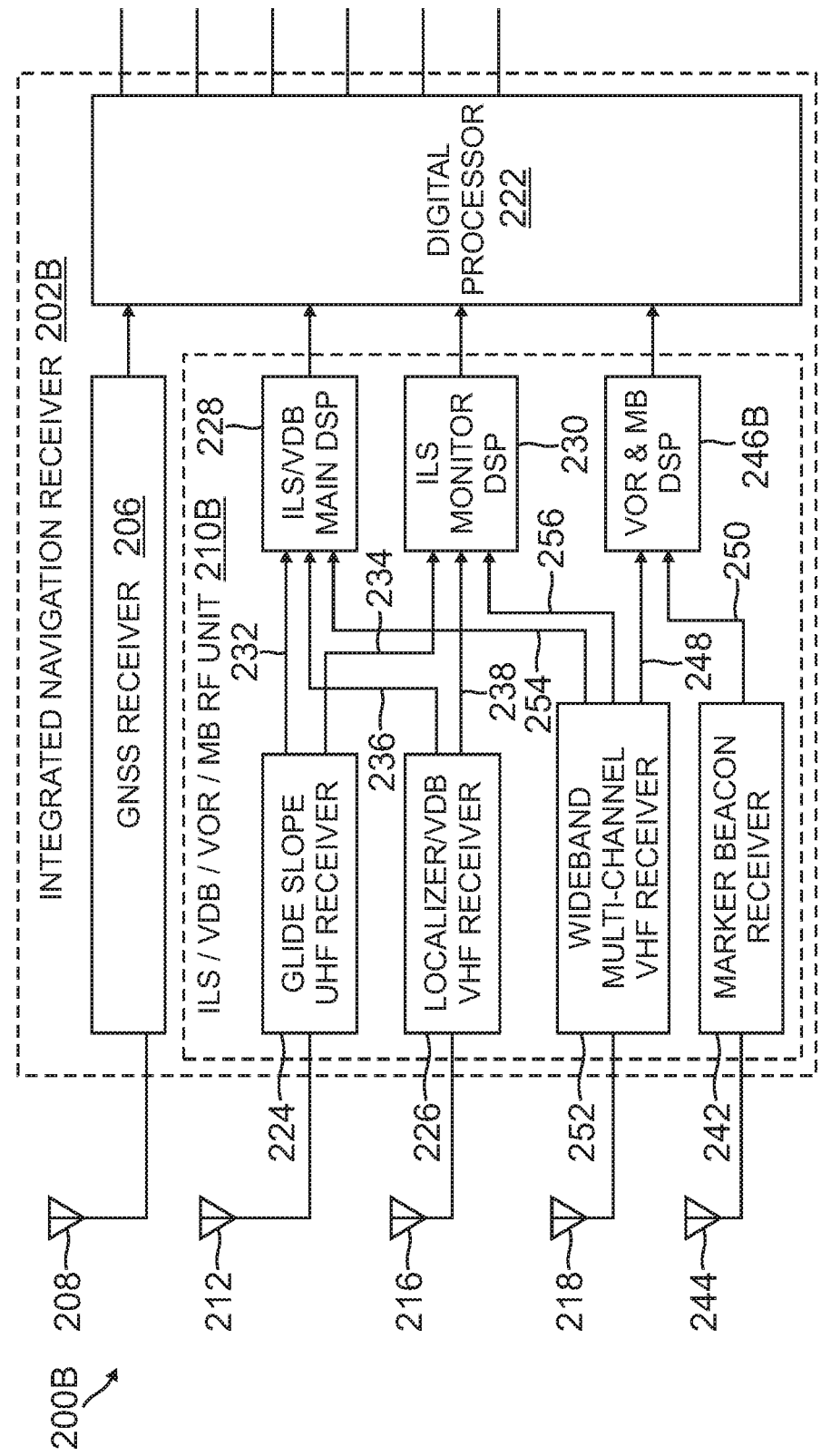
Figure 3B:
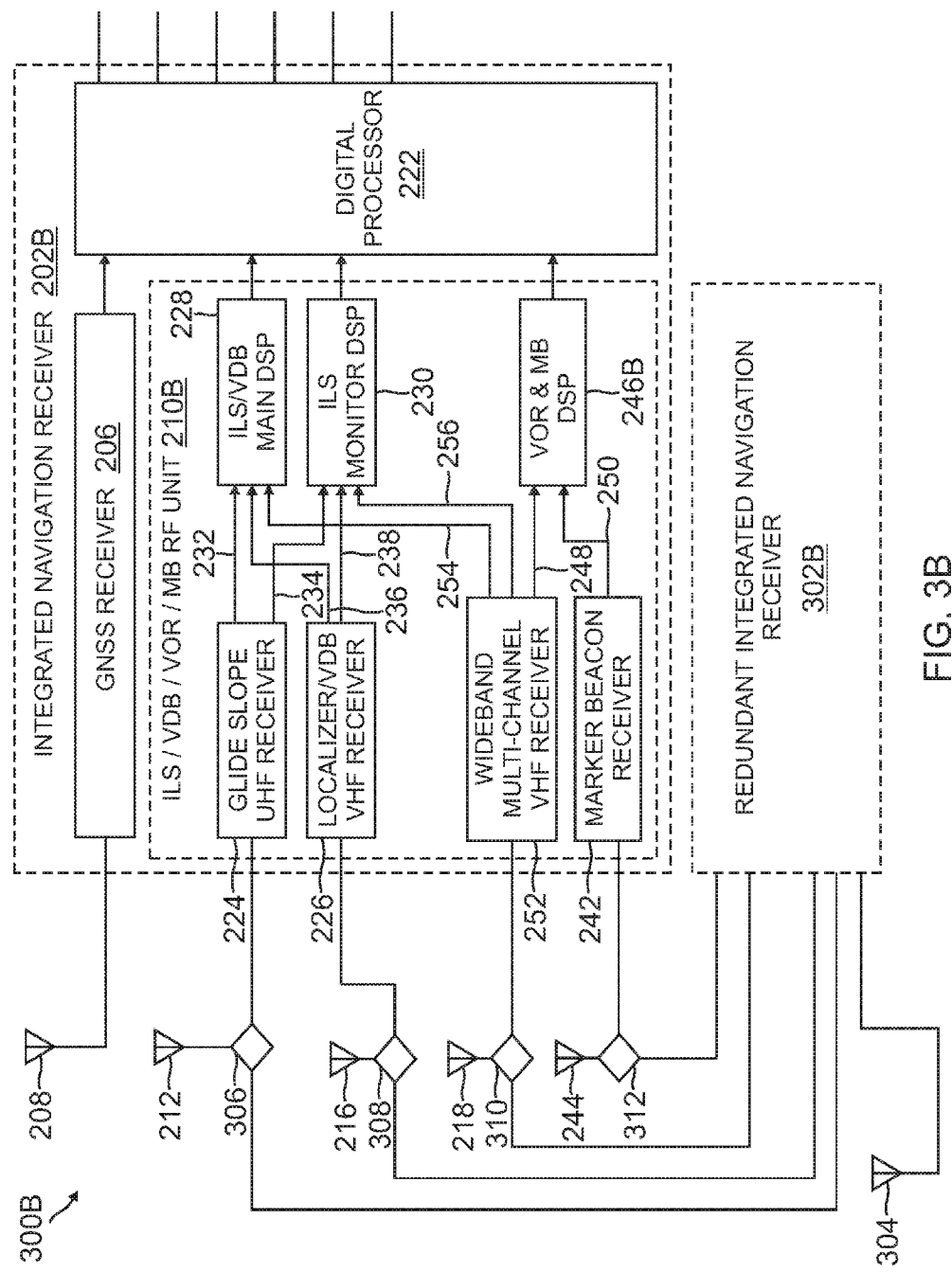
FIG. 3B is a block diagram depicting an exemplary embodiment of a redundant radio navigation system including a plurality of the redundant radio navigation systems of FIG. 2B.

In addition, when the landing mode is ILS, the wideband multi-channel receiver connected to the tail fin VOR antenna (such as tail mounted antenna 106) can be used to receive VOR and ILS Localizer signals while the conventional VHF receiver connected to the ILS localizer antenna (such as nose mounted antenna 104) is used to receive ILS Localizer signals during all phases of the approach and landing. In exemplary embodiments, the selection of which of the two ILS Localizer signals to use during initial approach and during final approach and landing can now be done digitally. In exemplary embodiments, there no longer is a need to have four VHF receivers connected to the tail fin VOR antenna (such as tail mounted antenna 106) at any time. The number of VHF receivers connected to the VOR antenna can be minimized. In exemplary embodiments, there are only two redundant VHF receivers connected to the tail fin VOR antenna (such as tail mounted antenna 106) and installation losses are reduced by at least 4 dB and the VOR antenna coverage range is improved by a factor of 1.5. FIGS. 2B, 3B, and 4B and accompanying description below are directed toward detailed exemplary embodiments implementing this second part.

Figure 2C:
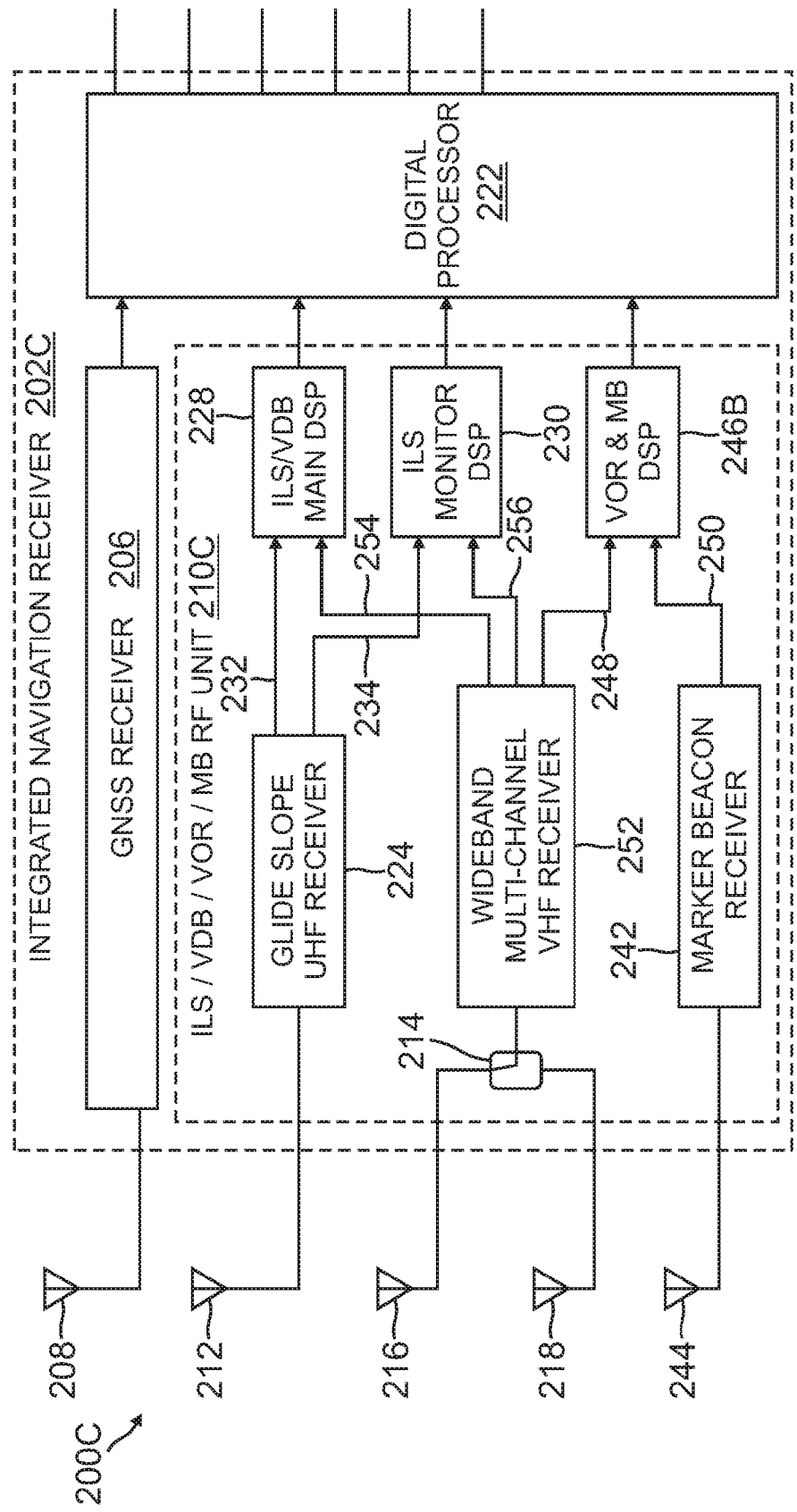
Figure 3C:
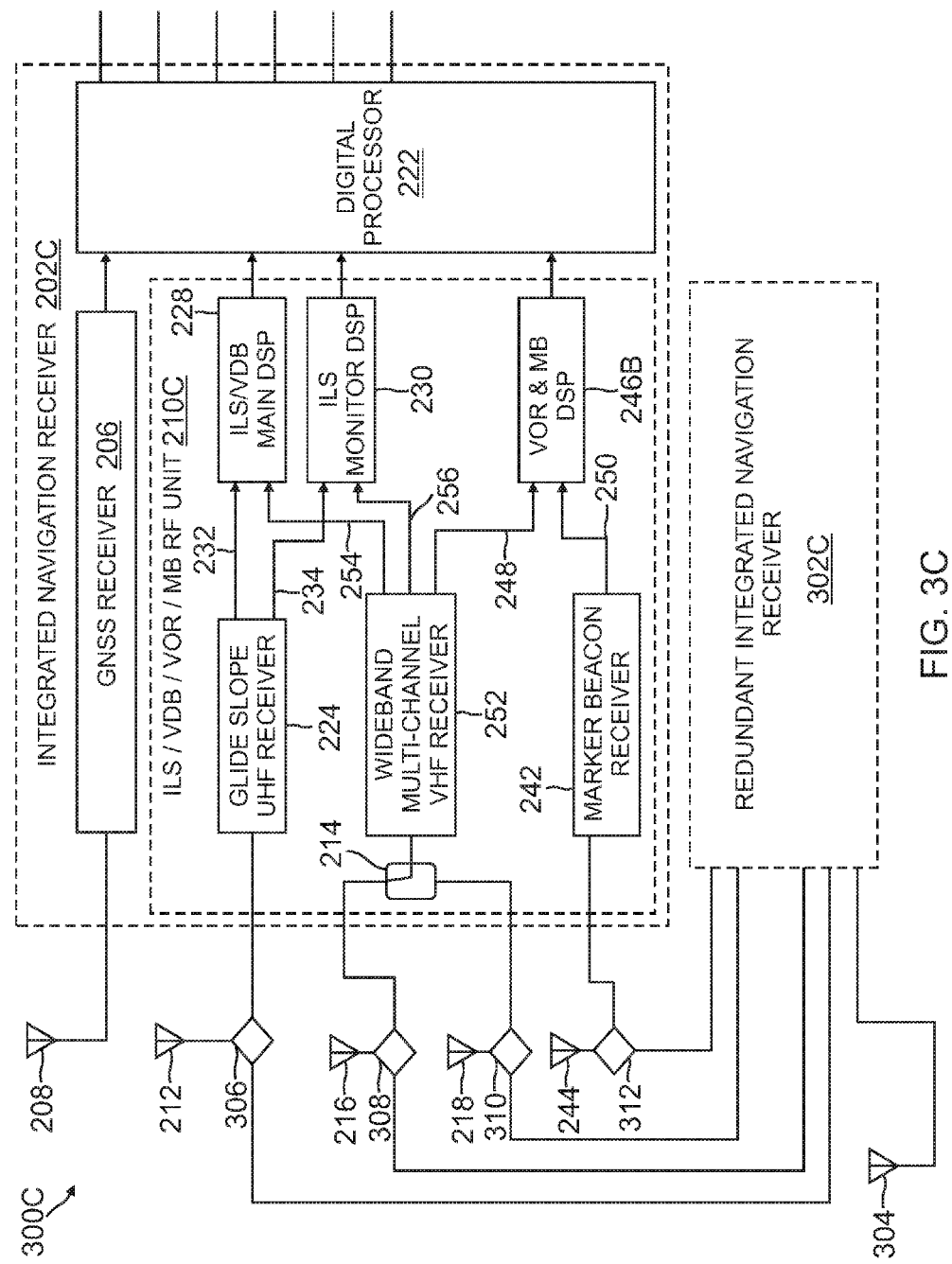
FIG. 3C is a block diagram depicting an exemplary embodiment of a redundant radio navigation system including a plurality of the redundant radio navigation systems of FIG. 2C.
Figure 4C:
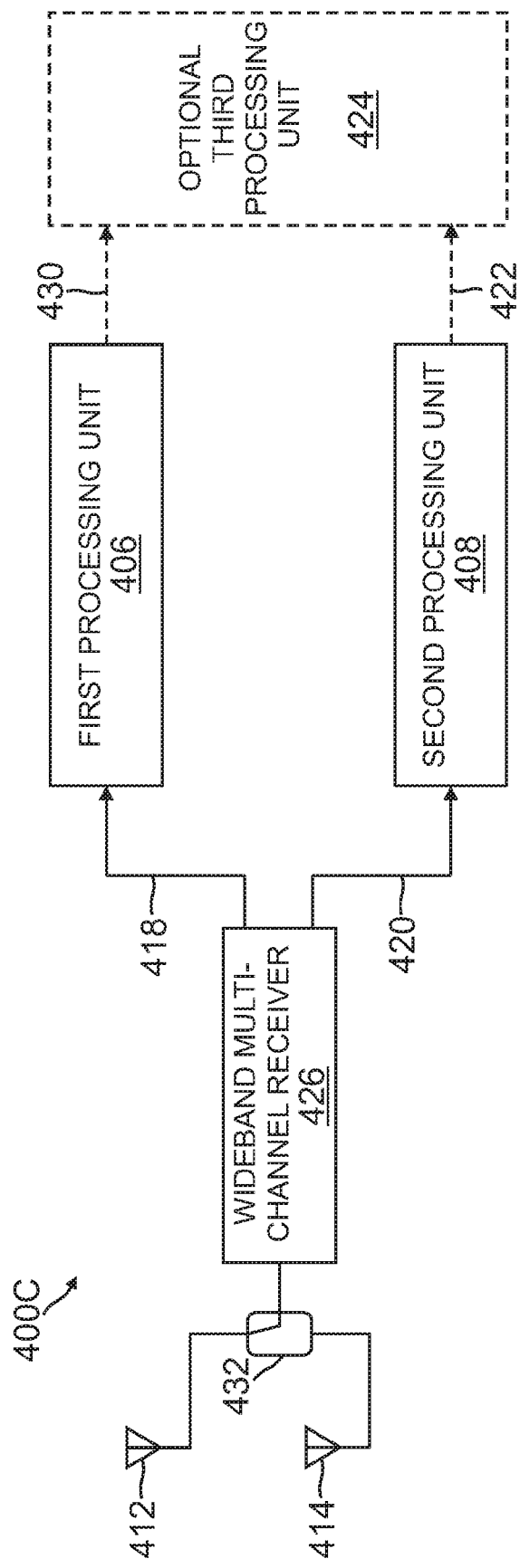

In exemplary embodiments on aircraft where use of two VHF receivers is not a cost effective solution, a third part of the systems and methods described herein uses only a single wideband multi-channel VHF receiver to receive both VOR and VDB signals or both VOR and ILS Localizer signals depending on the landing mode. The wideband multi-channel VHF receiver may be connected to the tail fin VOR antenna (such as tail mounted antenna 106) during initial approach and then switched to the ILS Localizer antenna during final approach and landing when the landing mode is ILS. When the landing mode is GLS and knowledge of the location of the VDB ground transmitter is available to the radio processing system, the switching of the antenna connected to wideband multi-channel receiver may be based on a calculation or estimation of which of the two antennas provides better coverage in the direction of the VDB ground transmitter. Thus, the total number of VHF receivers per aircraft installation may be reduced, thereby reducing the cost of the system. FIGS. 2C, 3C, and 4C and accompanying description below are directed toward detailed exemplary embodiments implementing this third part.

FIGS. 2A-2C are block diagrams depicting exemplary embodiments of radio signal processing systems 200 for receiving radio navigation (e.g. VOR) and landing guidance (e.g. ILS localizer or VDB) signals using individual receivers connected to each antenna, all of which are capable of supporting reception of signals in the same frequency band, and for combining or selecting one of two or more similar signals received on two or more antennas that can be implemented as radio signal processing system 108 in system 102 onboard aircraft 100. Each of FIGS. 2A-2C illustrates a different embodiment of radio signal processing systems 200, labeled 200A-200C respectively.

FIG. 2A is a block diagram depicting an exemplary embodiment of a radio signal processing system 200A for receiving signals using various antennas, each connected to a single receiver that is capable of receiving a single signal, and for combining or selecting one of two or more similar signals received on two or more antennas. Exemplary system 200A includes an integrated navigation receiver (INR) unit 202A consisting of a GNSS receiver 206, an instrument landing system (ILS)/VHF data broadcast (VDB) RF unit 210A, a VHF omni-ranging (VOR)/marker beacon (MB) RF unit 204, and a digital processor 222. GNSS receiver 206 is communicatively coupled to and receives RF signals through a GNSS antenna 208. GNSS receiver is communicatively coupled to and outputs signals to the digital processor 222.

ILS/VDB RF unit 210A includes a glide slope UHF receiver 224, a localizer/VDB VHF receiver 226, an ILS/VDB main digital signal processor (DSP) 228, and an ILS monitor digital signal processor (DSP) 230. The glide slope UHF receiver 224 is communicatively coupled to and receives radio frequency (RF) signals through glide slope antenna 212. The localizer/VDB VHF receiver 226 is communicatively coupled to and receives RF signals through either a localizer antenna 216 or a VOR/VDB antenna 218 depending on the position of switch 214 that is coupled to both the localizer antenna 216 and the VOR/VDB antenna 218 (through a power splitter 220). In exemplary embodiments, the localizer/VDB VHF receiver 226 is a single channel receiver that is only capable of tuning to one channel at a time. The localizer/VDB VHF receiver 226 is communicatively coupled to and outputs signals to the ILS/VDB main DSP 228 through signal line 236 and also to the ILS monitor DSP 230 through signal line 238. The glide slope UHF receiver 224 is also a single channel receiver that is communicatively coupled to and outputs glide slope signals received from the glide slope antenna 212 to the ILS/VDB main DSP 228 through signal line 232 and to the ILS monitor DSP 230 through signal line 234.

When the system 200A is operating in an instrument landing system (ILS) mode, the localizer/VDB VHF receiver 226 is tuned to the ILS localizer frequency (channel) and switch 214 is positioned to receive the ILS localizer signal through the localizer antenna 216 throughout all phases of landing or through the VOR/VDB antenna 218 during initial approach and then switched to receive through the ILS localizer antenna 216 during final approach and landing. The localizer/VDB VHF receiver 226 outputs the received localizer signal to the ILS/VDB main DSP 228 through signal line 236 and to the ILS monitor DSP 230 through signal line 238. The ILS/VDB main DSP 228 and the ILS monitor DSP 230 both process the same data, the ILS monitor DSP 230 being used to validate the data processed by the ILS/VDB main DSP 228 to ensure that it is substantially identical. Thus, the ILS/VDB main DSP 228 and the ILS monitor DSP 230 enable two different parallel processing channels. Both the ILS/VDB main DSP 228 and the ILS monitor DSP 230 output the received ILS localizer and glide slope main and monitor signals to the digital processor 222 for generation of horizontal (localizer) and vertical (glide slope) deviation signals, comparison checking and to output the deviation signals to the autopilot along with validity information.

When the system 200A is operating in a GNSS landing system (GLS) mode, the localizer/VDB VHF receiver 226 is tuned to the VDB frequency (channel) and switch 214 is positioned to receive the VDB signal through the VOR/VDB antenna 218 and power splitter 220 and outputs the VDB signal to the ILS/VDB main DSP through the signal line 236.

VOR/MB RF unit 204 includes VOR/VDB VHF receiver 240 and marker beacon (MB) receiver 242. VOR/VDB VHF receiver 240 is communicatively coupled to and receives RF signals through the VOR/VDB antenna 218 through power splitter 220. Power splitter 220 couples the output of the VOR/VDB antenna 218 with both the VOR/VDB VHF receiver 240 and the ILS localizer/VDB VHF receiver 226 through switch 214. In the exemplary embodiments of FIGS. 2A and 3A, the VOR/VDB VHF receiver 240 is only capable of receiving (tuning to) one channel at a time. The VOR/VDB VHF receiver 240 is communicatively coupled to and outputs signals to VOR/VDB and MB DSP 246A through signal line 248. MB receiver 242 is communicatively coupled to and receives RF signals through the marker beacon (MB) antenna 244 and outputs the received signals to VOR/VDB and MB DSP 246A through signal line 250.

When the system 200A is operating in an instrument landing system (ILS) mode, VOR/VDB VHF receiver 240 is tuned to the VOR frequency channel, receives the VOR signal from the VOR/VDB antenna 218 and outputs the received signal to VOR/VDB & MB DSP 246A. When the system 200A is operating in a GNSS landing system (GLS) mode, VOR/VDB VHF receiver 240 is tuned to the VDB frequency channel, receives the VDB signal from the VOR/VDB antenna 218 and outputs the received signal to VOR/VDB & MB DSP 246A. In this mode, both the VOR/VDB & MB DSP 246A and the ILS/VDB main DSP 228 are both processing VDB data and both of them output any received VDB signals to digital processor 222 which selects one of the signals or combines them in phase to decode VDB messages transmitted by the ground station. Digital processor 222 uses the decoded VDB messages containing corrections and way points along with the ranging signals provided by the GNSS receiver to compute the aircraft position and deviations from the landing glide path for output to the auto-pilot. In exemplary embodiments, the outputs of the digital processor 222 go to another avionics computer system that performs flight control or auto-pilot functionality.

FIG. 2B is a block diagram depicting an exemplary embodiment of a radio signal processing system 200B for receiving signals using various antennas, each connected to a single receiver with some receivers being capable of receiving multiple signals, and for combining or selecting one of two or more similar signals received on two or more antennas. System 200B includes similar components to system 200A and operates according to similar principles and methods as system 200A described above. The difference between system 200B and system 200A is that system 200B includes INR 202B that includes different components than INR 202A. Specifically, ILS/VDB RF unit 210A and VOR/MB RF unit 204 are replaced with ILS/VDB/VOR/MB RF unit 210B. The VOR/VDB VHF receiver 240 of INR 202A is replaced with wideband multi-channel VHF receiver 252 and switch 214 and power splitter 220 are eliminated in INR 202B. Wideband multi-channel VHF receiver 252 is capable of receiving multiple RF signals in the 108-118 MHz band simultaneously. Wideband multi-channel VHF receiver 252 is communicatively coupled to and receives signals through VOR/VDB antenna 218. Wideband multi-channel VHF receiver 252 is communicatively coupled to and outputs signals to ILS/VDB main DSP 228 and ILS monitor DSP 230 through signal line 254 and signal line 256, respectively, and to VOR & MB DSP 246B through signal line 248. Localizer/VDB VHF receiver 226 is communicatively coupled and receives signals only through localizer antenna 216. Localizer/VDB VHF receiver 226 is communicatively coupled to and outputs signals to ILS/VDB main DSP 228 and ILS monitor DSP 230, through signal line 236 and signal line 238, respectively.

When operating in the instrument landing system (ILS) mode and during all phases of landing, the localizer signal is received using the localizer/VDB VHF receiver 226 through localizer antenna 216 and output to the ILS/VDB main DSP 228 through signal line 236 and the ILS monitor DSP through signal line 238. During all phases of instrument landing system (ILS) mode and simultaneous to reception of the localizer signal through localizer antenna 216, the localizer signal is also received using the wideband multi-channel VHF receiver 252 through VOR/VDB antenna 218 and output to the ILS/VDB main DSP 228 through signal line 254 and the ILS monitor DSP 230 through signal line 256. In exemplary embodiments, both the ILS/VDB main DSP 228 and the ILS monitor DSP 230 select the signal inputs from wideband multi-channel VHF receiver 252 during initial approach and switch to select the signal inputs from localizer/VDB VHF receiver 226 during final approach as commanded by an input from the flight control or auto-pilot system. Alternatively, the ILS/VDB main DSP 228 and the ILS monitor DSP 230 may select the strongest of the two localizer signals during initial approach and switch to select the localizer signal inputs from localizer/VDB VHF receiver 226 during final approach.

During GNSS landing system (GLS) mode, the VDB signal is received using the localizer/VDB VHF receiver 226 through localizer antenna 216 and output to the ILS/VDB main DSP 228 through signal line 236. During GNSS landing system (GLS) mode and simultaneous to reception of the VDB signal through localizer antenna 216, the VDB signal is also received using wideband multi-channel VHF receiver 252 through VOR/VDB antenna 218 and output to the ILS/VDB main DSP 228 through signal line 254. The ILS/VDB main DSP 228 receives VDB signals from both the localizer/VDB VHF receiver 226 and the wideband VHF receiver 252. In exemplary embodiments, the ILS/VDB main DSP 228 either combines the two VDB signals in phase to construct a composite VDB signal or selects the strongest of the two signals and decodes the VDB messages received from the ground station. In exemplary embodiments implementing the composite VDB signal approach, a unique sequence at the beginning of the VDB message is used to detect that it is a valid VDB message and also determine the phase of the signal. In these embodiments, the phase of either of the signals can be adjusted so that it matches the other signal before they are combined. In exemplary embodiments implementing the strongest signal approach, the power level of each of the VDB signals is detected and the higher power signal is selected. It is understood that other methods can be implemented as well to average or use the two VDB signals received from the two different antennas in another way.

In exemplary embodiments, the wideband multi-channel VHF receiver 252 enables all of the localizer signal, the VOR signal, and the VDB signal to always be received through the VOR/VDB antenna 218, during both instrument landing system (ILS) mode and GNSS landing system (GLS) mode and at other times during flight. In exemplary embodiments of radio signal processing system 200B, use of the wideband multi-channel VHF receiver 252 facilitating the removal of the power splitter and switch allows for less signal loss of the RF signals entering the wideband multi-channel VHF receiver 252 and the localizer/VDB VHF receiver 226.

FIG. 2C is a block diagram depicting an exemplary embodiment of a radio signal processing system 200C for receiving signals using various antennas, each connected to a single receiver with some receivers being capable of receiving a single signal while others being capable of receiving multiple signals, and for switching the antenna connected to a multi-channel receiver to one of two or more antennas. System 200C includes similar components to system 200B and operates according to similar principles and methods as system 200B described above. The difference between system 200C and system 200B is that system 200C includes INR 202C that includes different components than INR 202B. Specifically, ILS/VDB/VOR/MB RF unit 210B is replaced with ILS/VDB/VOR/MB RF unit 210C. System 200C, INR 202C, and ILS/VDB/VOR/MB RF unit 210C eliminate the localizer/VDB VHF receiver 226 and adds switch 214 to communicatively couple the wideband multi-channel VHF receiver 252 to either the localizer antenna 216 or the VOR/VDB antenna 218 during different phases of a landing mode. While this further reduces the quantity of VHF receivers necessary, it does limit system 200C such that it can only receive signals from either the localizer antenna 216 or the VOR/VDB antenna 218 at one time. Wideband multi-channel VHF receiver 252 processes the various signals received in the 108-118 MHz band and outputs the correct signals to ILS/VDB main DSP 228, ILS monitor DSP 230, and VOR & MB DSP 246C through signal line 254, signal line 256, and signal line 248 respectively.

During instrument landing system (ILS) mode, switch 214 is initially switched so that both the localizer signal and the VOR signal are simultaneously received using the wideband multi-channel VHF receiver 252 through VOR/VDB antenna 218. The localizer signal is output to the ILS/VDB main DSP 228 through signal line 254 and output to the ILS monitor DSP through signal line 256. The VOR signal is simultaneously output to the VOR & MB DSP 246B through signal line 248. During instrument landing system (ILS) mode and once the aircraft is lined up with the localizer signal, switch 214 is switched so that both the localizer signal and the VOR signal are simultaneously received using the wideband multi-channel VHF receiver 252 through localizer antenna 216. The localizer signal is still output to the ILS/VDB main DSP 228 through signal line 254 and output to the ILS monitor DSP through signal line 256. While the VOR signal is simultaneously output to the VOR & MB DSP 246B through signal line 248, the VOR signal received through the localizer antenna 216 may not be very useful if the VOR ground station is behind the aircraft during this phase of landing.

During GNSS landing system (GLS) mode, the VDB signal and VOR signal are both simultaneously received using wideband multi-channel VHF receiver 252 through either VOR/VDB antenna 218 or through localizer antenna 216 depending on the position of switch 214. The position of switch 214 may be selected based on knowledge of which antenna may provide better coverage during that phase of landing. This is another limitation of system 200C, that the VDB signal can only be received from the VOR/VDB antenna 218 or the localizer antenna 216, but not both simultaneously. In exemplary embodiments, the wideband multi-channel VHF receiver 252 enables all of the localizer signal, the VOR signal, and the VDB signal to always be received through either the VOR/VDB antenna 218 or the localizer antenna 216 during both instrument landing system (ILS) mode and GNSS landing system (GLS) mode. During phases of flight prior to landing when VDB and ILS localizer signal reception is not required, the wideband multi-channel VHF receiver 252 and switch 214 are positioned to receive the VOR navigation signal through VOR/VDB antenna 218.

FIGS. 3A-3C are block diagrams depicting exemplary embodiments of redundant radio signal processing systems 300 for receiving signals using various antennas, each antenna connected to a single receiver, and for combining or selecting one of two or more similar signals received on two or more antennas that can be implemented as radio signal processing system 108 in system 102 onboard aircraft 100. Each of FIGS. 3A-3C illustrates a different embodiment of radio signal processing systems 300, labeled 300A-300C respectively.

FIG. 3A is a block diagram depicting an exemplary embodiment of a redundant radio signal processing system 300A for receiving signals using various antennas, each connected to a single receiver capable of receiving a single signal, and for combining or selecting one of two or more similar signals received on two or more antennas. System 300A includes all the components of system 200A and operates according to similar principles and methods as system 200A described above. The difference between system 300A and system 200A is that system 300A also includes a redundant integrated navigation receiver (INR) 302A. Redundant integrated navigation receiver (INR) 302A has a redundant set of components similar to integrated navigation receiver (INR) 202A and is coupled to another GNSS antenna 304 and the glide slope antenna 212 through a power splitter 306. Redundant integrated navigation receiver (INR) 302B is also coupled to the localizer antenna 216 through a power splitter 308 and to VOR/VDB antenna 218 through a power splitter 310. Redundant integrated navigation receiver (INR) 302B may also be coupled to marker beacon (MB) antenna 244 through power splitter 312. While redundant radio signal processing system 300B only shows one redundant set of components, other embodiments include more than one redundant set of components.

FIG. 3B is a block diagram depicting an exemplary embodiment of a redundant radio signal processing system 300B for receiving signals using various antennas, each connected to a single receiver with some receivers being capable of receiving a single signal while others being capable of receiving multiple signals, and for combining or selecting one of two or more similar signals received on two or more antenna. System 300B includes all the components of system 200B and operates according to similar principles and methods as system 200B described above. The difference between system 300B and system 200B is that system 300B also includes a redundant integrated navigation receiver (INR) unit 302B. Redundant integrated navigation receiver (INR) unit 302B has a redundant set of components similar to integrated navigation receiver (INR) unit 202A and is coupled to another GNSS antenna 304 and the glide slope antenna 212 through a power splitter 306. Redundant integrated navigation receiver (INR) unit 302B is also coupled to localizer antenna 216 through power splitter 308, to VOR/VDB antenna 218 through power splitter 310, and to marker beacon (MB) antenna 244 through power splitter 312. While redundant radio signal processing system 300B only shows one redundant set of components, other embodiments include more than one redundant set of components.

FIG. 3C is a block diagram depicting an exemplary embodiment of a redundant radio signal processing system 300C for receiving signals using various antennas, each connected to a single receiver with some receivers capable of receiving a single signal while others being capable of receiving multiple signals, and for switching/selecting the antenna connected to a multi-channel receiver to one of two or more antennas. System 300C includes all the components of system 200C and operates according to similar principles and methods as system 200C described above. The difference between system 300C and system 200C is that system 300C also includes a redundant integrated navigation receiver (INR) 302C. Redundant integrated navigation receiver (INR) unit 302C has a redundant set of components similar to integrated navigation receiver (INR) unit 202C and is coupled to another GNSS antenna 304 and the glide slope antenna 212 though a power splitter 306. Redundant integrated navigation receiver (INR) unit 302C is also coupled to localizer antenna 216 though power splitter 308, to VOR/VDB antenna 218 through power splitter 310, and to marker beacon (MB) antenna 244 through power splitter 312. While redundant radio signal processing system 300C only shows one redundant set of components, other embodiments include more than one redundant set of components.

FIGS. 4A-4E are block diagrams depicting exemplary embodiments of simplified radio signal processing systems 400 for receiving signals using two or more antennas, each connected to a single receiver capable of receiving one signal or multiple signals, and combining or selecting one of two or more similar signals received on two or more antennas that can be implemented as radio signal processing system 108 in system 102 onboard aircraft 100. Each of FIGS. 4A-4E illustrates a different embodiment of radio signal processing systems 400, labeled 400A-400E respectively.

FIG. 4A is a block diagram depicting an exemplary embodiment of a simplified radio signal processing system 400A for receiving signals using two antennas, each connected to a single receiver capable of receiving one signal, and for combining or selecting one of two similar signals received on both antennas. System 400A includes a first receiver 402, a second receiver 404, a first processing unit 406, and a second processing unit 408. First receiver 402 is communicatively coupled to a switch 410 coupling it to a first antenna 412 and a second antenna 414 (through a power splitter 416). Second receiver 404 is communicatively coupled to the second antenna 414 through power splitter 416. First receiver 402 is communicatively coupled to first processing unit 406 through a first signal line 418 (which is divided into two parts 418A and 418B in exemplary embodiments implementing optional third processing unit 424 described below). Second receiver 404 is communicatively coupled to the second processing unit 408 through a second signal line 420 as explained below. In exemplary embodiments, first processing unit 406 is also coupled to the second processing unit 408 through third signal line 422.

When system 400A is operating in a first mode and switch 410 is switched so that first receiver 402 is communicatively coupled to first antenna 412, a first signal is received by the first receiver 402 through the first antenna 412 and sent to the first processing unit 406 through first signal line 418 (including 418A and 418B) while at the same time a second signal is received by the second receiver 404 through the second antenna 414 and the power splitter 416 and sent to the second processing unit 408 through second signal line 420. When system 400A is operating in a first mode and switch 410 is switched so that first receiver 402 is communicatively coupled to second antenna 414 through power splitter 416, a first signal is received by the first receiver 402 through the second antenna 414 and sent to the first processing unit 406 through first signal line 418 (including 418A and 418B) while at the same time a second signal is received by the second receiver 404 also through the second antenna 414 and power splitter 416 and sent to the second processing unit 408 through second signal line 420. In this first mode with switch 412 in either position, processing unit 406 and signal processing unit 408 decode data from two different signals and deliver the dissimilar data to the external users of the data. In exemplary embodiments, an optional third processing unit 424 is included between the first receiver 402 and the first processing unit 406, fitting between the two portions of first signal line 418 (including 418A and 418B).

When system 400A is operating in a second mode and switch 410 is switched so that first receiver 402 is communicatively coupled to first antenna 412, a third signal is received by the first receiver 402 through the first antenna 412 which outputs the signals to the first processing unit 406 through first signal line 418 (including 418A and 418B) and is also received by the second receiver 404 through the second antenna 414 through the power splitter 416 which outputs the signal through the second processing unit 408 to the first processing unit 406 through second signal line 420 and third signal line 422. In this second mode and with this first switch position, first signal processing unit 406 select the strongest of the third signals received from the first antenna 412 and the second antenna 414 or combines the third signals in phase, and decodes the data for output to the external users of the data. When the switch is positioned so that first receiver 402 is communicatively coupled to second antenna 414 through power splitter 416, the third signal is received by the first receiver 402 through the second antenna 414 and sent to the first processing unit 406 through first signal line 418 (including 418A and 418B) while at the same time a second signal is also received by the second receiver 404 through the second antenna 414 through the power splitter 416 and sent to the second processing unit 408 through signal line 420. In this second mode and with this second switch position, signal processing unit 406 and signal processing unit 408, decode data from two different signals and deliver the dissimilar data to the external users of the data. In exemplary embodiments, the optional third processing unit 424 is included between the first receiver 402 and the first processing unit 406, fitting between the two portions of first signal line 418 (including 418A and 418B).

FIG. 4B is a block diagram depicting an exemplary embodiment of a simplified radio signal processing system 400B for receiving signals using two antennas, one connected to a receiver capable of receiving a single signal and the other connected to a receiver capable of receiving multiple signals, and for the combining or selection of one of two similar signals received on both antennas. System 400B includes first receiver 402, a wideband multi-channel receiver 426, first processing unit 406, and second processing unit 408. First receiver 402 is communicatively coupled to first antenna 412. Wideband multi-channel receiver 426 is communicatively coupled to second antenna 414. First receiver 402 is communicatively coupled to first processing unit 406 through first signal line 418. Wideband multi-channel receiver 426 is communicatively coupled to the second processing unit 408 through second signal line 420. Wideband multi-channel receiver 426 is communicatively coupled to first processing unit 406 through third signal line 428.

When system 400B is operating in a first mode, a first signal is received by the first receiver 402 through the first antenna 412 and sent to the first processing unit 406 through first signal line 418. When system 400B is operating in a first mode, a second signal is received by wideband multi-channel receiver 426 through the second antenna 414 and sent to the second processing unit 408 through second signal line 420. In some embodiments when system 400B is operating in a first mode, the first signal is also received by the wideband multi-channel receiver 426 through the second antenna 414 and sent to the first processing unit 406 through third signal line 428. The first processing unit 406 selects one of the similar first signals received from the first receiver 402 and the wideband multi-channel receiver 426 and delivers it to the external users.

When system 400B is operating in a second mode, a third signal is received by the first receiver 402 through the first antenna 412 and sent to the first processing unit 406 through first signal line 418. When system 400B is operating in a second mode, the third signal is also received by the wideband multi-channel receiver 426 through the second antenna 414 and sent to the first processing unit 406 through third signal line 428. The first processing unit 406 either selects the stronger of the first signals received from the first receiver 402 and the wideband multi-channel receiver 426 or combines them in phase and delivers it to the external users. In some embodiments when system 400B is operating in a second mode, the second signal is also received by the wideband multi-channel receiver 426 through the second antenna 414 and sent to the second processing unit 408 through second signal line 420.

In exemplary embodiments, each of the first signal, the second signal, and the third signal are received by the wideband multi-channel receiver 426 through the second antenna 414 and sent to either the first processing unit 406 or the second processing unit 408 when system 400B is operating in either the first mode or the second mode. In exemplary embodiments, optional third processing unit 424 is communicatively coupled to first processing unit 406 through fifth signal line 430 and communicatively coupled to second processing unit 408 through third signal line 422.

FIG. 4C is a block diagram depicting an exemplary embodiment of a simplified radio signal processing system 400C for receiving signals using two antennas and a single wideband multi-channel receiver capable of receiving two or more signals simultaneously and for selecting the antenna through which the multi-channel receiver is to receive the multiple signals. System 400C includes wideband multi-channel receiver 426, first processing unit 406, and second processing unit 408. Wideband multi-channel receiver 426 is communicatively coupled to a switch 432 coupling it to first antenna 412 and second antenna 414. Wideband multi-channel receiver 426 is communicatively coupled to first processing unit 406 through first signal line 418. Wideband multi-channel receiver 426 is communicatively coupled to second processing unit 408 through second signal line 420.

When system 400C is operating in a first mode, the position of switch 432 is controlled by first processing unit 406 so that wideband multi-channel receiver 426 is communicatively coupled to second antenna 414 when the aircraft is far away from a ground transmitter of a first signal whose location is known and then the position of switch 432 is switched to communicatively couple the wideband multi-channel receiver to first antenna 412 when the aircraft gets closer and lines up the directional pattern of the first antenna with the ground transmitter of the first signal. When system 400C is operating in a first mode, a first signal is received by the wideband multi-channel receiver 426 through the selected antenna and sent to the first processing unit 406 through first signal line 418. When system 400C is operating in a first mode, a second signal is also received by the wideband multi-channel receiver 426 through the selected antenna and sent to the second processing unit 408 through second signal line 420.

When system 400C is operating in a second mode, the position of switch 432 is switched by first processing unit 406 so that wideband multi-channel receiver 426 is communicatively coupled to receive a third signal from either first antenna 412 or second antenna 414, whichever provides the stronger signal. When system 400C is operating in a second mode, a third signal is received by wideband multi-channel receiver 426 through the selected antenna and sent to the first processing unit 406 through first signal line 418 and a second signal is also received simultaneously by wideband multi-channel receiver 426 through the selected antenna and sent to the second processing unit 408 through second signal line 420.

In exemplary embodiments, each of the first signal, the second signal, and the third signal are received by the wideband multi-channel receiver 426 through either the first antenna 412 or the second antenna 414 depending on the position of the switch 432 and sent to either the first processing unit 406 or the second processing unit 408 when system 400B is operating in either the first mode or the second mode. In exemplary embodiments, optional third processing unit 424 is communicatively coupled to first processing unit 406 through fifth signal line 430 and communicatively coupled to second processing unit 408 through third signal line 422.

Figure 4D:
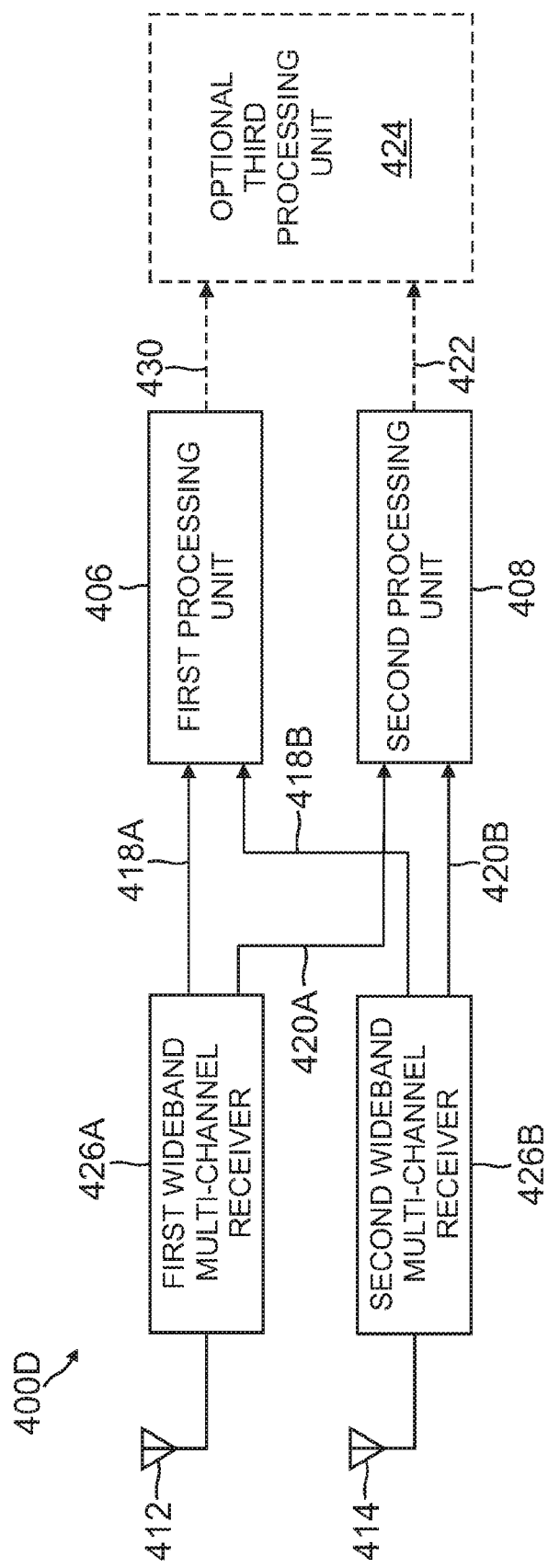

FIG. 4D is a block diagram depicting an exemplary embodiment of a simplified radio signal processing system 400D for receiving signals using two antennas and two wideband multi-channel receiver capable of receiving two or more signals simultaneously and for selecting the antenna through which the multi-channel receiver is to receive the multiple signals. System 400D includes first wideband receiver 426A, second wideband receiver 426B, first processing unit 406 and second processing unit 408. First wideband multi-channel receiver 426A is communicatively coupled to first antenna 412. Second wideband multi-channel receiver 426B is communicatively coupled to second antenna 414. First wideband multi-channel receiver 426A is communicatively coupled to first processing unit 406 through first signal line 418A. First wideband multi-channel receiver 426A is communicatively coupled to second processing unit 408 through second signal line 420A. Second wideband multi-channel receiver 426B is communicatively coupled to first processing unit 406 through first signal line 418B. Second wideband multi-channel receiver 426C is communicatively coupled to second processing unit 408 through second signal line 420B.

When system 400D is operating in a first mode, the first signal is received by the first wideband multi-channel receiver 426A through first antenna 412 and sent to the first processing unit 406 through first signal line 418A. When system 400D is operating in the first mode, the first signal is also received by the second wideband multi-channel receiver 426B through second antenna 414 and sent to the first processing unit 406 through third signal line 418B. The first processing unit 406 either selects one of the first signals received from the first wideband multi-channel receiver 426A and the second wideband multi-channel receiver 426B and delivers it to the external users. When system 400D is operating in the first mode, the second signal is received by the second wideband multi-channel receiver 426A through first antenna 412 and sent to the second processing unit 408 through second signal line 420A. When system 400D is operating in the first mode, the second signal is also received by the second wideband multi-channel receiver 426B through second antenna 414 and sent to the second processing unit 408 through fourth signal line 420B. The second processing unit 408 selects the stronger of the second signals received from the first wideband multi-channel receiver 426A and the second wideband multi-channel receiver 426B and delivers it to the external users.

When system 400D is operating in a second mode, the third signal is received by the first wideband multi-channel receiver 426A through the first antenna 412 and sent to the first processing unit 406 through the first signal line 418A and the second signal is also received simultaneously by the first wideband multi-channel receiver 426A through the first antenna 412 and sent to the second processing unit 408 through second signal line 420A. When system 400D is operating in the second mode, the third signal is also received by the second wideband multi-channel receiver 426B through the second antenna 414 and sent to the first processing unit 406 through the third signal line 418B and the second signal is also received simultaneously by the second wideband multi-channel receiver 426B through the second antenna 414 and sent to the second processing unit 408 through the second antenna 414 and sent to the second processing unit 408 through fourth signal line 420B. The first processing unit 406 either selects the stronger of the third signals received from the first wideband multi-channel receiver 426A and the second wideband multi-channel receiver 426B or combines them in phase and delivers it to the external users. The second processing unit 408 selects the stronger of the second signals received from the first wideband multi-channel receiver 426A and the second wideband multi-channel receiver 426B and delivers it to the external users. In exemplary embodiments, optional third processing unit 424 is communicatively coupled to first processing unit 406 through fifth signal line 430 and communicatively coupled to second processing unit 408 through third signal line 422.

Figure 4E:
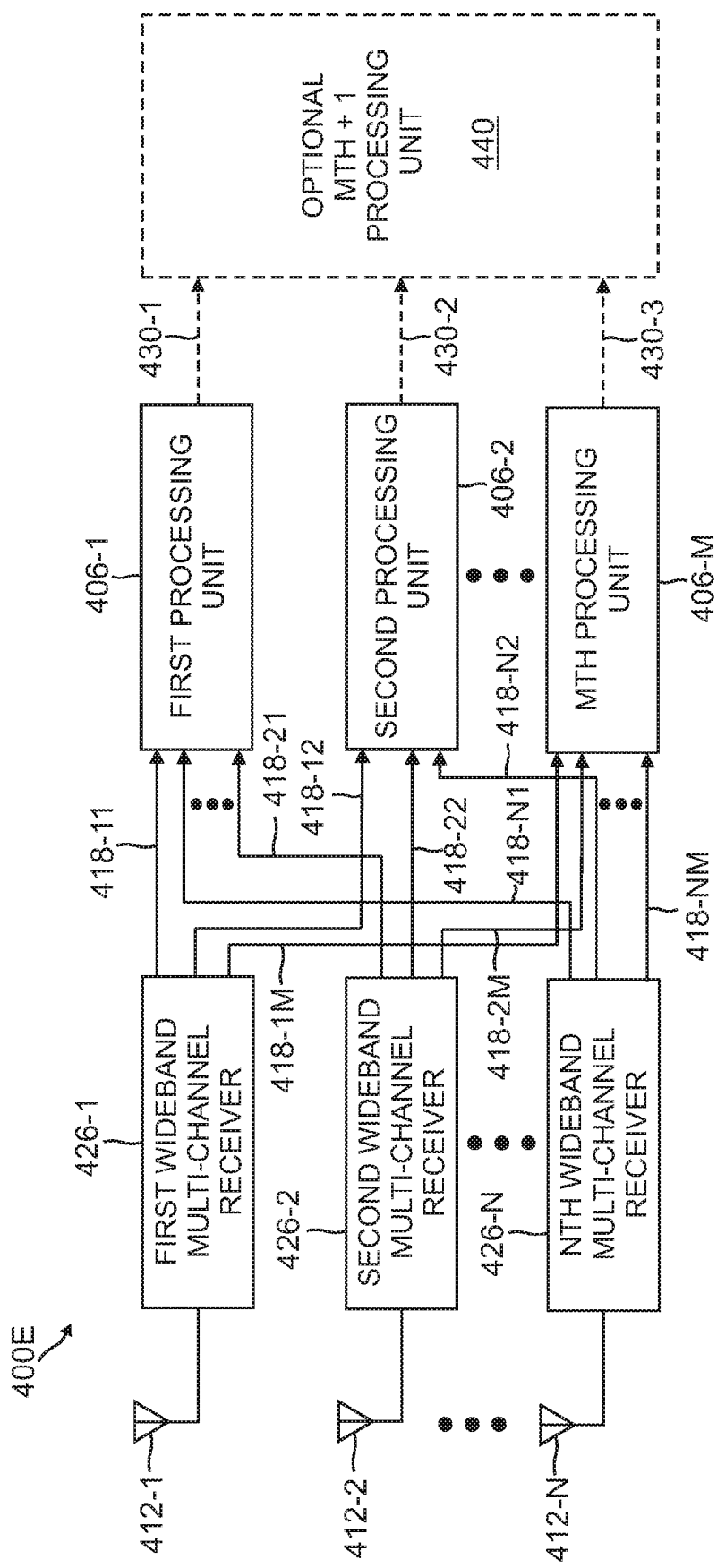

FIG. 4E is a block diagram depicting an exemplary embodiment of a simplified radio signal processing system 400E for receiving signals using a plurality of antennas and a plurality of wideband multi-channel receivers capable of receiving two or more signals simultaneously and for selecting the antenna through which the multi-channel receiver is to receive the multiple signals or combining signals simultaneously received through two or more antennas. System 400E includes similar components to system 400D and operates according to similar principles and methods as system 400D described above. The difference between system 400E and system 400D is that system 400D includes more than two wideband multi-channel receivers 426 communicatively coupled to more than two antennas and more than two processing units. Specifically, system 400E includes up to N wideband multi-channel receivers 426-1 to 426-N communicatively coupled to antennas 412-1 to 412-N respectively. First wideband multi-channel receiver 426-1 is further coupled to up to M processing units 406-1 to 406-M through signal lines 418-11 to 418-1M respectively. Second wideband multi-channel receiver 426-2 is further coupled to up to M processing units 406-1 to 406-M through signal lines 418-21 to 418-2M. Nth wideband multi-channel receiver 426-N is further coupled to the first processing units 406-1 to 406-M through signal lines 418-N1 to 418-NM. The Mth processing unit combines or selects one of the N Mth signals received through the N antennas.

System 400E can include any number of wideband multi-channel receivers capable of receiving M signals simultaneously, through N antennas, and M processing units interconnected together with signal lines. In exemplary embodiments, optional Mth+1 processing unit 440 is communicatively coupled to processing units 406-1 to 406-M through signal lines 430-1 to 430-M, respectively.

In exemplary embodiments of any of systems 400A-400D, first antenna 412 is mounted on a nose of an aircraft. In exemplary embodiments of any of systems 400A-400D, second antenna 414 is mounted on a vertical tail fin of an aircraft. In exemplary embodiments of any of systems 400A-400D, the first operation mode is an instrument landing system (ILS) mode. In exemplary embodiments of any of systems 400A-400D, the second operation mode is a GNSS landing system (GLS) mode. In exemplary embodiments of any of systems 400A-400D, the GLS mode is a GPS landing system mode. In exemplary embodiments of any of systems 400A-400D, the first signal is an instrument landing system (ILS) mode localizer signal. In exemplary embodiments of any of systems 400A-400D, the second signal is a VHF Omnidirectional Range (VOR) signal. In exemplary embodiments of any of systems 400A-400D, the third signal is a VHF Data Broadcast (VDB) signal. In exemplary embodiments of any of systems 400A-400D, the first signal occupies a first channel of pre-defined bandwidth in a frequency range, the second signal occupies a second channel in the same frequency range, and the third signal occupies a third channel in the same frequency range; and the first channel, the second channel, and the third channel do not overlap.

Figure 5:
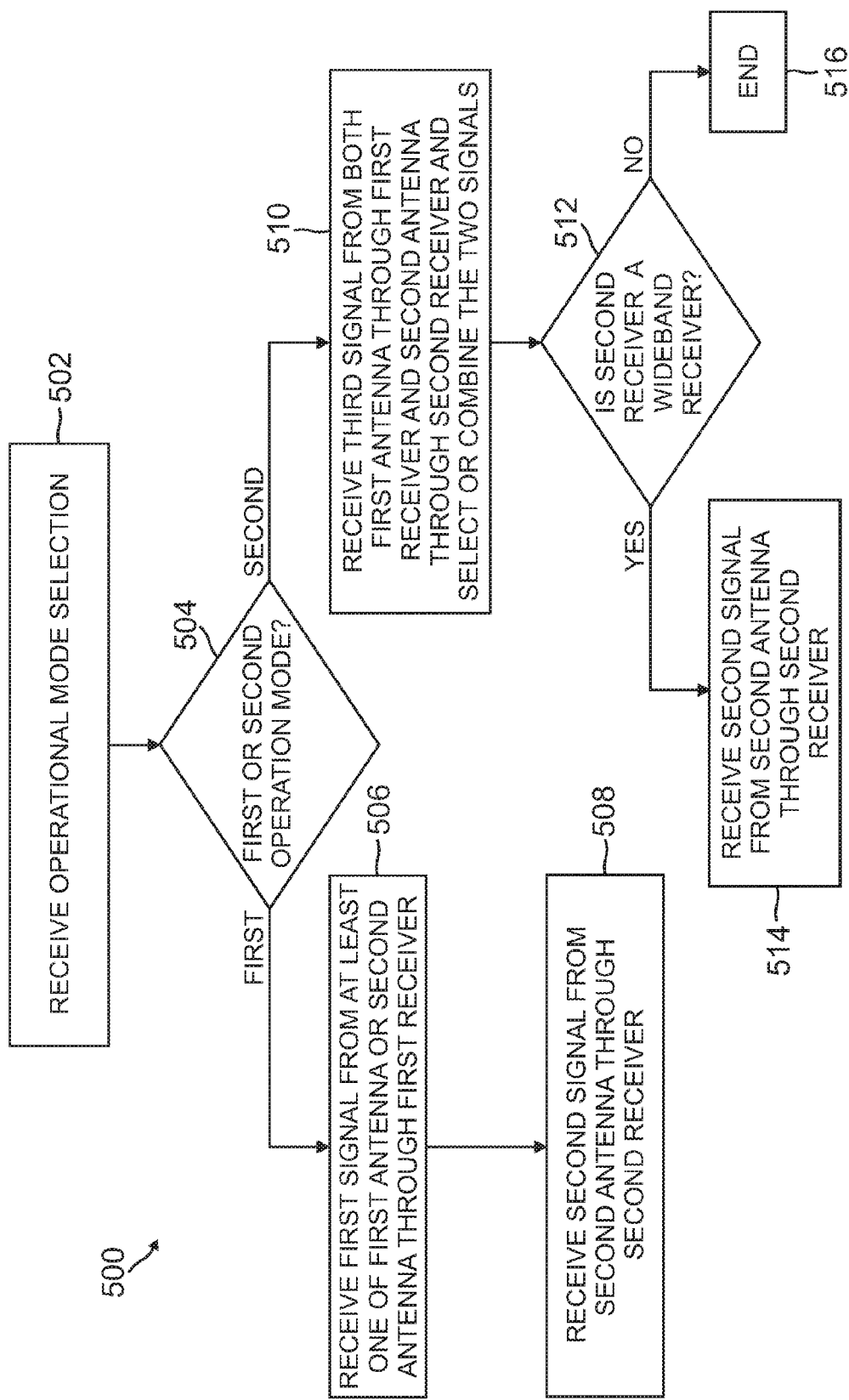
FIG. 5 is a flow chart illustrating an exemplary method for receiving signals using a single antenna and either combining or selecting one of similar signals received on two or more antennas.

FIG. 5 is a flow chart illustrating an exemplary method 500 for receiving one or two signals using two antennas and combining similar signals received on both antennas. Exemplary method 500 begins at block 502 with receiving an operational mode selection.

Exemplary method 500 proceeds to decision block 504 with deciding whether a first or second operation mode was selected. Exemplary method 500 branches to block 506 with when a first operation mode is selected, to receive a first signal from at least one of a first antenna and a second antenna through a first receiver and select one of the two signals. Exemplary method 500 proceeds to block 508 with when a first operation mode is selected, receiving a second signal from the second antenna. In exemplary embodiments, the second signal is received from the second antenna through a second receiver. In exemplary embodiments, the first signal is initially received from the second antenna and then is subsequently received from the first antenna. In exemplary embodiments of exemplary method 500, the first operation mode is an instrument landing system (ILS) mode. In exemplary embodiments of exemplary method 500, the first signal is an instrument landing system (ILS) mode localizer signal. In exemplary embodiments of exemplary method 500, the second signal is a VHF Omnidirectional Range (VOR) signal.

If at decision block 504 it is determined that a second operation mode was selected, then exemplary method 500 branches to block 510 with when a second operation mode is selected, receiving a third signal from both the first antenna through the first receiver and from the second antenna through the second receiver and selecting the stronger of the two signals or combining them in phase. Exemplary method 500 then proceeds to decision block 512 with deciding whether the second receiver is a wideband receiver 512. If at decision block 512 it is determined that the second receiver is a wideband receiver, then exemplary method 500 branches to block 514 with receiving the second signal from the second antenna through the second receiver. If at decision block 512 it is determined that the second receiver is not a wideband receiver, then exemplary method 500 branches to block 516 where exemplary method 500 ends. In exemplary embodiments of exemplary method 500, the second operation mode is a GNSS landing system (GLS) mode. In exemplary embodiments of exemplary method 500, the GLS mode is a GPS landing system mode. In exemplary embodiments of exemplary method 500, the third signal is a VHF Data Broadcast (VDB) signal.

In exemplary embodiments of exemplary method 500, the first signal occupies a first channel within a frequency range, the second signal occupies a second channel within the same frequency range, and the third signal occupies a third channel within the same frequency range; and the first channel, the second channel, and the third channel do not overlap.

Figure 6:
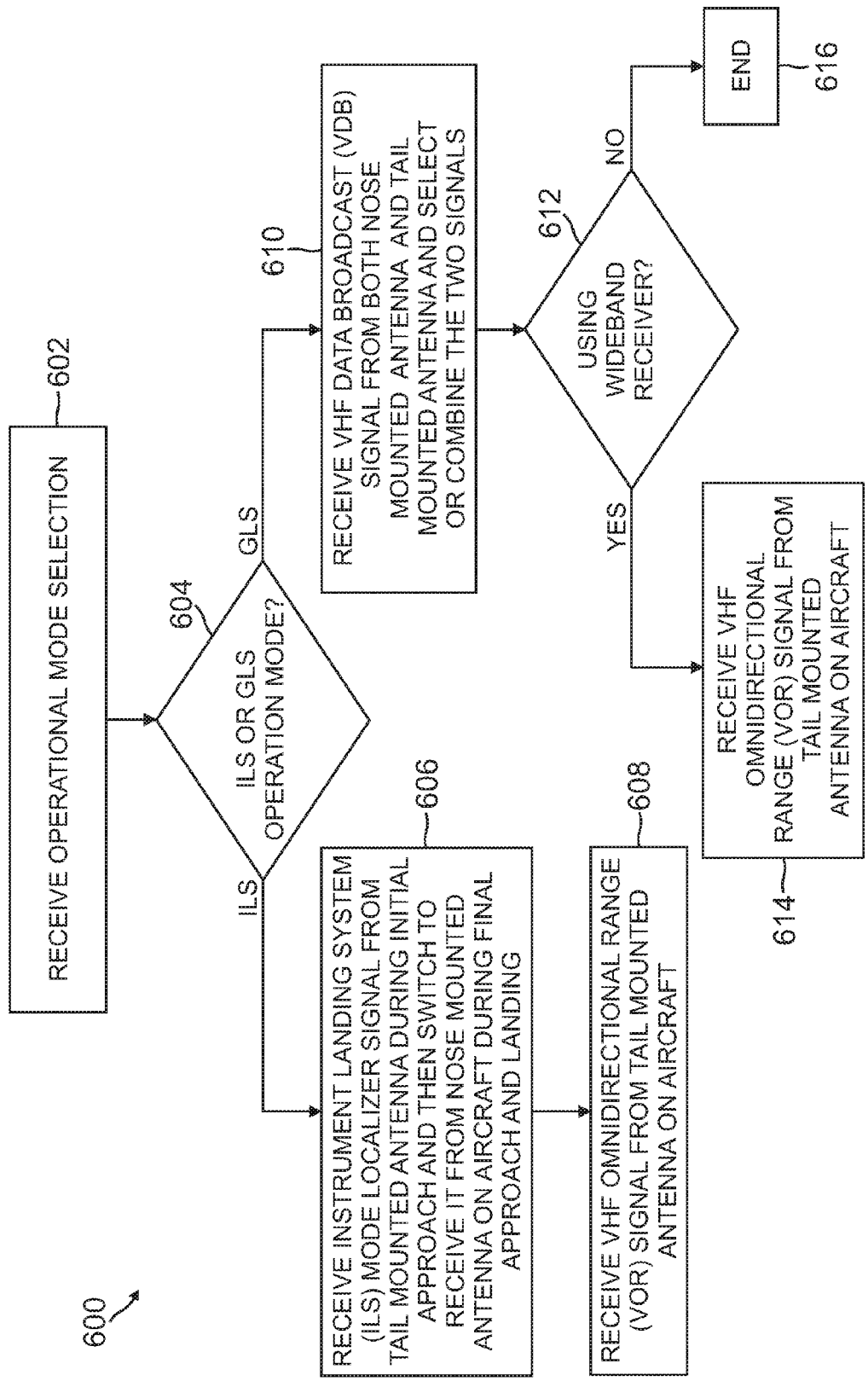
FIG. 6 is a flow chart illustrating an exemplary method for receiving signals using two or more antennas and either combining or selecting one of similar signals received on two or more antennas.

FIG. 6 is a flow chart illustrating an exemplary method 600 for receiving signals using a single antenna and combining similar signals received on two or more antennas. Exemplary method 600 begins at block 602 with receiving an operational mode selection. Exemplary method 600 proceeds to decision block 604 with deciding whether an instrument landing system (ILS) operation mode or a GNSS landing system (GLS) operation mode was selected. If an ILS operation mode was selected, then exemplary method 600 branches to block 606 with receiving an instrument landing system (ILS) mode localizer signal from a tail mounted antenna and then switching to receiving the ILS localizer signal from a nose mounted antenna on an aircraft. Exemplary method 600 proceeds to block 608 with when an instrument landing system (ILS) mode is selected, receiving a VHF omnidirectional range (VOR) signal from the tail mounted antenna on the aircraft.

If at decision block 604 it is determined that GLS operation mode was selected, then exemplary method 600 branches to block 610 with receiving a VHF data broadcast (VDB) signal from both the nose mounted antenna and the tail mounted antenna and selecting the stronger of the two signals or combining the two signals in phase. Exemplary method 600 proceeds to decision block 612 with deciding whether a wideband receiver is being used to implement the method. If at decision block 612 it is determined that a wideband receiver is being used, then exemplary method 600 branches to block 614 with receiving the VHF omnidirectional range (VOR) signal from the tail mounted antenna on the aircraft. If at decision block 612 it is determined that a wideband receiver is not being used, then exemplary method 600 branches to block 616 where exemplary method 600 ends. In exemplary embodiments of method 600 when an instrument landing system (ILS) mode is selected, receiving a VHF omnidirectional range (VOR) signal from the tail mounted antenna on the aircraft provided a wideband receiver is connected to the tail mounted antenna. In exemplary embodiments of exemplary method 600, the GLS mode is a GPS landing system mode.

In exemplary embodiments of exemplary method 600, the first signal occupies a first channel within a frequency range, the second signal occupies a second channel within the same frequency range, and the third signal occupies a third channel within the same frequency range; and the first channel, the second channel, and the third channel do not overlap.

Figure 7:
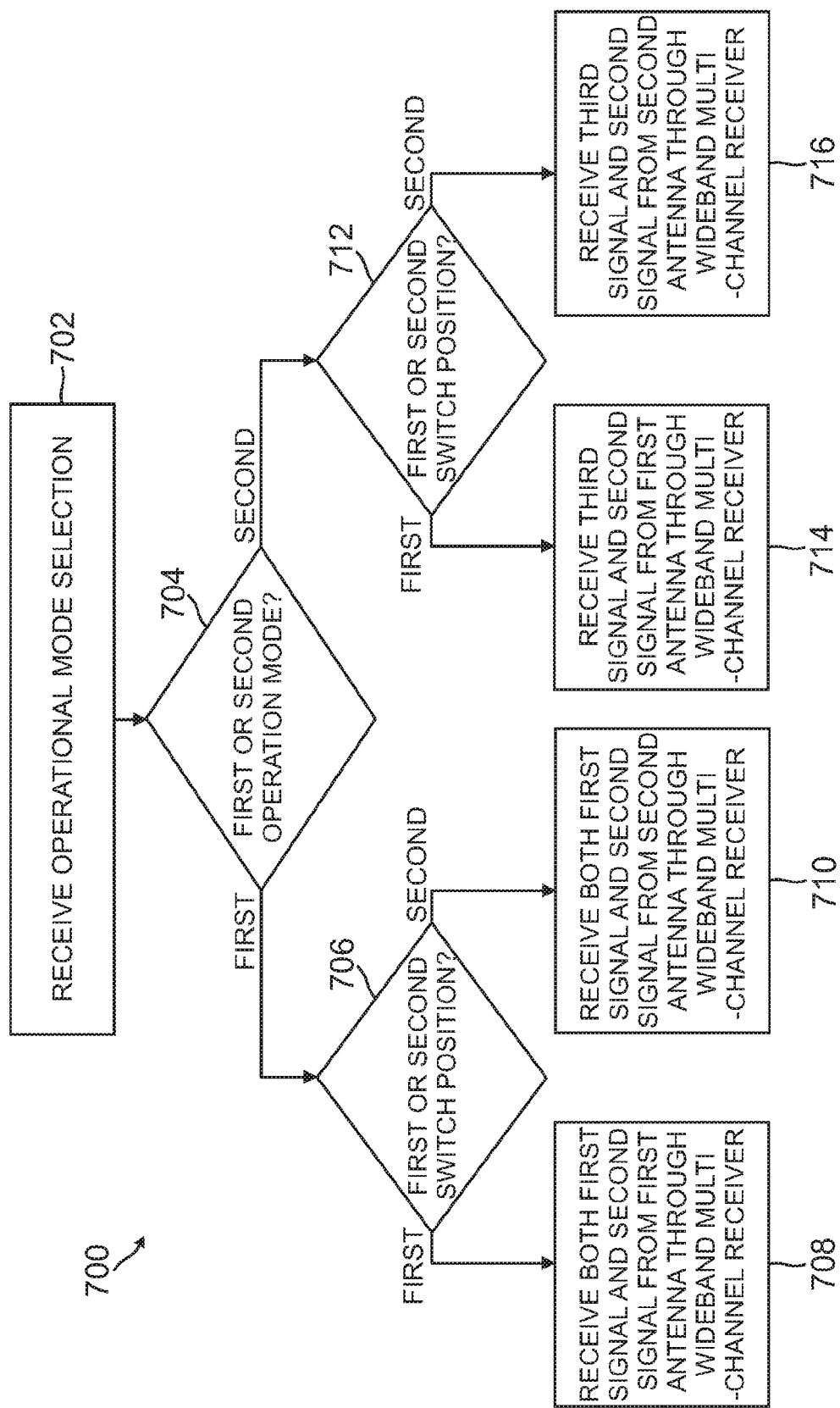
FIG. 7 is a flow chart illustrating an exemplary method for receiving signals using a plurality of antennas coupled to a single wideband receiver through a switch.

FIG. 7 is a flow chart illustrating an exemplary method 700 for receiving signals using a plurality of antennas coupled to a wideband receiver through a switch. Exemplary method 700 begins at block 702 with receiving an operational mode selection. Exemplary method 700 proceeds to decision block 704 with deciding whether a first or second operation mode is selected. If a first operation mode is selected, then exemplary method 700 branches to decision block 706 with deciding whether a switch is in a first or a second switch position. If the switch is in a first position, then exemplary method 700 branches to block 708 with receiving both a first signal and a second signal from the first antenna through the wideband multi-channel receiver. If at decision block 706 it is determined that the switch is in a second position, then exemplary method 700 branches to block 710 with receiving both the first signal and the second signal from the second antenna through the wideband multi-channel receiver. In exemplary embodiments, the first and second signals are initially received from the second antenna when the switch is in the second position and then subsequently received from the first antenna when the switch is in the first position. In exemplary embodiments, the first operation mode is an instrument landing system (ILS) mode. In exemplary embodiments, the first signal is an instrument landing system (ILS) mode localizer signal. In exemplary embodiments, the second signal is a VHF Omnidirectional Range (VOR) signal.

If at decision block 704 it is determined that the second operation mode is selected, then exemplary method 700 branches to decision block 712 with deciding whether a switch is in a first or second switch position. If the switch is in a first position, then exemplary method 700 branches to block 714 with receiving both a third signal and a second signal from the first antenna through the wideband multi-channel receiver. If at decision block 712 it is determined that the switch is in the second position, then exemplary method 700 branches to block 716 with receiving both the third signal and the second signal from the second antenna through the wideband multi-channel receiver. In exemplary embodiments, the second operation mode is a GNSS landing system (GLS) mode. In exemplary embodiments, the GLS mode is a GPS landing system mode. In exemplary embodiments, the third signal is a VHF Data Broadcast (VDB) signal.

In exemplary embodiments of exemplary method 700, the first signal occupies a first channel within a frequency range, the second signal occupies a second channel within the same frequency range, and the third signal occupies a third channel within the same frequency range; and the first channel, the second channel, and the third channel do not overlap.

As used in this description, a processing unit, digital signal processor (DSP), digital processor, etc. (such as, but not limited to, first processing unit 406, second processing unit 408, ILS/VDB main DSP 228, ILS monitor DSP 230, VOR/VDB & MB DSP 246A, VOR & MB DSP 246B, and digital processor 222 described above and shown in the Figures) includes or functions with software programs, firmware or other computer readable instructions for carrying out various methods, process tasks, calculations, and control functions, used in the collaborative navigation systems using optical pattern analysis to determine relative locations between a host unit and a remote unit and methods for performing the optical pattern analysis of a pattern according to embodiments of the present invention.

These instructions are typically stored on any appropriate computer readable medium (such as, but not limited to, memory) used for storage of computer readable instructions or data structures. The computer readable medium can be implemented as any available media that can be accessed by a general purpose or special purpose computer or processor, or any programmable logic device. Suitable processor-readable media may include non-transitory storage or memory media such as magnetic or optical media. For example, non-transitory storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Although specific embodiments have been illustrated and described herein, it will be appreciated by those of ordinary skill in the art that any arrangement, which is calculated to achieve the same purpose, may be substituted for the specific embodiments shown. Therefore, it if manifestly intended that this invention be limited only by the claims and the equivalents thereof.

Example Embodiments

Example 1 includes a radio signal processing system comprising a first antenna; a second antenna; a first receiver communicatively coupled to the first antenna; a second receiver communicatively coupled to the second antenna; a first processing unit communicatively coupled to the first receiver and configured to receive a first signal from at least one of the first antenna and the second antenna when the system is operating in a first mode; a second processing unit communicatively coupled to the second receiver and configured to receive a second signal from the second antenna when the system is operating in a first mode; and wherein the first processing unit is further configured to receive a third signal from both the first antenna and the second antenna when the system is operating in a second mode.

Example 2 includes the system of Example 1, wherein both the first receiver and the second receiver are single channel receivers that can only tune a single channel at once.

Example 3 includes the system of Example 2, further comprising a switch communicatively coupling the first receiver to both the first antenna and a power splitter coupled to the second antenna, wherein the power splitter communicatively couples the second antenna to both the second receiver and the switch; wherein the first receiver receives the first signal from the first antenna when the switch is in a first position, and wherein the first receiver receives the first signal from the second antenna when the switch is in a second position.

Example 4 includes the system of any of Examples 2-3, further comprising a third processing unit positioned between the first receiver and the first processing unit; and wherein the first processing unit is further communicatively coupled to the second processing unit and is configured to receive signals from both the second processing unit and the third processing unit simultaneously; wherein the first processing unit is configured to receive the third signal from the first antenna through the first receiver and the third processing unit when the system is operating in a second mode; wherein the first processing unit is configured to receive the third signal from the second antenna through the second receiver and the second processing unit when the system is operating in a second mode; and wherein the first processing unit is configured to either select one of the third signal received from the first antenna or the third signal received from the second antenna; and combine the third signal received from the first antenna with the third signal received from the second antenna.

Example 5 includes the system of any of Examples 1-4, wherein the second receiver is a wideband multi-channel receiver configured to tune both the second signal and the third signal simultaneously; and wherein the first processing unit is communicatively coupled to the second receiver and is configured to simultaneously receive the third signal from the first antenna through the first receiver and the third signal from the second antenna through the second receiver when the system is operating in a second mode; and wherein the first processing unit is configured to either select one of the third signal received from the first antenna or the third signal received from the second antenna or combine the third signal received from the first antenna with the third signal received from the second antenna.

Example 6 includes the system of Example 5, wherein the first processing unit is further configured to simultaneously receive the first signal from both the first antenna and the second antenna when the system is operating in the first mode; and wherein the first processing unit is configured to select one of the first signal received from the first antenna or the first signal received from the second antenna.

Example 7 includes the system of any of Examples 1-6, wherein the first antenna is positioned at a nose of an aircraft; and wherein the second antenna is positioned at a vertical tail fin of an aircraft.

Example 8 includes the system of any of Examples 1-7, wherein the first operation mode is an instrument landing system (ILS) mode and the second operation mode is a GNSS landing system (GLS) mode.

Example 9 includes the system of any of Examples 1-8, wherein the first signal is an instrument landing system (ILS) mode localizer signal; wherein the second signal is a VHF Omnidirectional Range (VOR) signal; and wherein the third signal is a VHF Data Broadcast (VDB) signal.

Example 10 includes a method for receiving radio signals comprising receiving an operational mode selection; when a first operation mode is selected, receiving a first signal from a first antenna or a second antenna at a first processing unit; when the first operation mode is selected, receiving a second signal from the second antenna at a second processing unit; and when a second operation mode is selected, receiving a third signal from both the first antenna and the second antenna at the first processing unit.

Example 11 includes the method of Example 10, further comprising switching a switch coupling the a first receiver to both the first antenna and the second antenna through a power splitter such that receiving a first signal occurs from either the first antenna or the second antenna through the first receiver.

Example 12 includes the method of any of Examples 10-11, further comprising simultaneously receiving the second signal at the second processing unit and the third signal at the first processing unit from the second antenna through a second wideband multi-channel receiver when the system is operating in the second mode.

Example 13 includes the method of any of Examples 10-12, further comprising simultaneously receiving the first signal at the first processing unit from both the first antenna through the first receiver and the second antenna through the second wideband multi-channel receiver and receiving a second signal at the second processing unit through the second wideband multi-channel receiver when the system is operating in the first mode.

Example 14 includes the method of any of Examples 10-13, wherein the first operation mode is an instrument landing system (ILS) mode and the second operation mode is a GNSS landing system (GLS) mode.

Example 15 includes the method of any of Examples 10-14, wherein the first signal is an instrument landing system (ILS) mode localizer signal; wherein the second signal is a VHF omni ranging (VOR) signal; and wherein the third signal is a VHF data broadcast (VDB) signal.

Example 16 includes the method of any of Examples 10-15, wherein the first antenna is positioned at a nose of an aircraft; and wherein the second antenna is positioned at a vertical tail fin of an aircraft.

Example 17 includes a radio signal processing system comprising a first antenna; a second antenna; a switch switchably coupling the first antenna and the second antenna to a wideband multi-channel receiver; a processing unit communicatively coupled to the wideband multi-channel receiver; wherein the processing unit is configured to receive both a first signal and a second signal from the first antenna through the wideband multi-channel receiver when the system is operating in a first mode and the switch is in a first position; wherein the processing unit is configured to receive both the first signal and the second signal from the second antenna through the wideband multi-channel receiver when the system is operating in the first mode and the switch is in a second position; wherein the processing unit is configured to receive both a third signal and the second signal from the first antenna through the wideband multi-channel receiver when the system is operating in a second mode and the switch is in the first position; and wherein the processing unit is configured to receive both the third signal and the second signal from the second antenna through the wideband multi-channel receiver when the system is operating in the second mode and the switch is in the second position.

Example 18 includes the system of Example 17, wherein the first antenna is positioned at a nose of an aircraft; and wherein the second antenna is positioned at a vertical tail fin of an aircraft.

Example 19 includes the system of any of Examples 17-18, wherein the first mode is an instrument landing system (ILS) mode and the second mode is a GNSS landing system (GLS) mode.

Example 20 includes the system of any of Examples 17-19, wherein the first signal is an instrument landing system (ILS) mode localizer signal; wherein the second signal is a VHF Omnidirectional Range (VOR) signal; and wherein the third signal is a VHF Data Broadcast (VDB) signal.

Example 21 includes a method for receiving radio signals comprising receiving an operation mode selection; when a first operation mode is selected and a switch coupled between a first antenna and a wideband multi-channel receiver is in a first position, receiving both a first signal and a second signal from the first antenna through the wideband multi-channel receiver; when a first operation mode is selected and the switch coupled between the first antenna and the wideband multi-channel receiver is in a second position, receiving both the first signal and the second signal from the second antenna through the wideband multi-channel receiver; when a second operation mode is selected and the switch coupled between a second antenna and the wideband multi-channel receiver is in the first position, receiving both the third signal and the second signal from the first antenna through the wideband multi-channel receiver; and when a second operation mode is selected and the switch coupled between the second antenna and the wideband multi-channel receiver is in the second position, receiving both the third signal and the second signal from the second antenna through the wideband multi-channel receiver.

Example 22 includes the method of Example 21, wherein the first operation mode is an instrument landing system (ILS) mode and the second operation mode is a GNSS landing system (GLS) mode.

Example 23 includes the method of any of Examples 21-22, wherein the first signal is an instrument landing system (ILS) mode localizer signal; wherein the second signal is a VHF Omnidirectional Range (VOR) signal; and wherein the third signal is a VHF Data Broadcast (VDB) signal.

What is claimed is:

1. A radio signal processing system comprising:
a first antenna;
a second antenna;
a switch switchably coupling the first antenna and the second antenna to a wideband multi-channel receiver;
a processing unit communicatively coupled to the wideband multi-channel receiver;
wherein the processing unit is configured to receive both a first signal and a second signal from the first antenna through the wideband multi-channel receiver when the system is operating in a first mode and the switch is in a first position, wherein the first signal is an instrument landing system (ILS) mode localizer signal, wherein the second signal is a VHF Omnidirectional Range (VOR) signal;
wherein the processing unit is configured to receive both the first signal and the second signal from the second antenna through the wideband multi-channel receiver when the system is operating in the first mode and the switch is in a second position;
wherein the processing unit is configured to receive both a third signal and the second signal from the first antenna through the wideband multi-channel receiver when the system is operating in a second mode and the switch is in the first position, wherein the third signal is a VHF Data Broadcast (VDB) signal; and
wherein the processing unit is configured to receive both the third signal and the second signal from the second antenna through the wideband multi-channel receiver when the system is operating in the second mode and the switch is in the second position.

2. The system of claim 1, wherein the first antenna is positioned at a nose of an aircraft; and
wherein the second antenna is positioned at a vertical tail fin of the aircraft.

3. The system of claim 1, wherein the first mode is an instrument landing system (ILS) mode and the second mode is a GNSS landing system (GLS) mode.

4. A method for receiving radio signals comprising:
receiving an operation mode selection;
when a first operation mode is selected and a switch coupled between a first antenna and a wideband multi-channel receiver is in a first position, receiving both a first signal and a second signal from the first antenna through the wideband multi-channel receiver, wherein the first signal is an instrument landing system (ILS) mode localizer signal, wherein the second signal is a VHF Omnidirectional Range (VOR) signal;
when a first operation mode is selected and the switch coupled between the first antenna and the wideband multi-channel receiver is in a second position, receiving both the first signal and the second signal from the second antenna through the wideband multi-channel receiver;
when a second operation mode is selected and the switch coupled between a second antenna and the wideband multi-channel receiver is in the first position, receiving both the third signal and the second signal from the first antenna through the wideband multi-channel receiver, wherein the third signal is a VHF Data Broadcast (VDB) signal; and
when a second operation mode is selected and the switch coupled between the second antenna and the wideband multi-channel receiver is in the second position, receiving both the third signal and the second signal from the second antenna through the wideband multi-channel receiver.

5. The method (700) of claim 4, wherein the first antenna (104) is positioned at a nose of an aircraft (100); and
wherein the second antenna (106) is positioned at a vertical tail fin of an aircraft (100).

6. The method of claim 4, wherein the first operation mode is an instrument landing system (ILS) mode and the second operation mode is a GNSS landing system (GLS) mode.

7. A radio signal processing system comprising:
a first means for receiving wireless signals;
a second means for receiving wireless signals;
a means for selecting between the first means for receiving wireless signals and the second means for receiving wireless signals;
a wideband multi-channel means for receiving signals from the means for selecting;
a means for processing the signals received from the wideband multi-channel means for receiving the signals;
wherein the means for processing is configured to receive both a first signal and a second signal from the first means for receiving wireless signals through the wideband multi-channel means for receiving signals when the system is operating in a first mode and the means for selecting is selecting the first means for receiving wireless signals, wherein the first signal is an instrument landing system (ILS) mode localizer signal, wherein the second signal is a VHF Omnidirectional Range (VOR) signal;
wherein the means for processing is configured to receive both the first signal and the second signal from the second means for receiving wireless signals through the wideband multi-channel means for receiving signals when the system is operating in the first mode and the means for selecting is selecting the second means for receiving first signals wirelessly;
wherein the means for processing is configured to receive both a third signal and the second signal from the first means for receiving wireless signals through the wideband multi-channel means for receiving signals when the system is operating in a second mode and the means for selecting is selecting the first means for receiving wireless signals, wherein the third signal is a VHF Data Broadcast (VDB) signal; and
wherein the means for processing is configured to receive both the third signal and the second signal from the second means for receiving wireless signals through the wideband multi-channel means for receiving signals when the system is operating in the second mode and the means for selecting is selecting the second means for receiving wireless signals.

8. The system of claim 7, wherein the first means for receiving wireless signals is positioned at a nose of an aircraft; and
wherein the second means for receiving wireless signals is positioned at a vertical tail fin of the aircraft.

9. The system of claim 7, wherein the first mode is an instrument landing system (ILS) mode and the second mode is a GNSS landing system (GLS) mode.

* * * * *